US012534514B2

(12) United States Patent
Smith et al.

(10) Patent No.: US 12,534,514 B2
(45) Date of Patent: Jan. 27, 2026

(54) BIOLOGICAL AND SYNTHETIC MOLECULES INHIBITING RESPIRATORY SYNCYTIAL VIRUS INFECTION

(71) Applicant: Fraunhofer-Gesellschaft zur Förderung der angewandten Forschung E.V., Munich (DE)

(72) Inventors: David Michael Smith, Leipzig (DE); Christin Möser, Muldestausee (DE); Thomas Grunwald, Leipzig (DE); Leila Issmail, Leipzig (DE); Christian Jäger, Halle (DE); Martin Kleinschmidt, Halle (DE); Daniel Ramsbeck, Halle (DE); Mirko Buchholz, Halle (DE)

(73) Assignee: Fraunhofer-Gesellschaft Zur Forderung Der Angewanditen Forschung, Munich (DE)

( * ) Notice: Subject to any disclaimer, the term of this patent is extended or adjusted under 35 U.S.C. 154(b) by 891 days.

(21) Appl. No.: 17/604,376

(22) PCT Filed: Apr. 17, 2020

(86) PCT No.: PCT/EP2020/060870
§ 371 (c)(1),
(2) Date: Oct. 15, 2021

(87) PCT Pub. No.: WO2020/212576
PCT Pub. Date: Oct. 22, 2020

(65) Prior Publication Data
US 2022/0195016 A1    Jun. 23, 2022

(30) Foreign Application Priority Data
Apr. 18, 2019   (DE) ................. 10 2019 110 314.2

(51) Int. Cl.
*A61K 38/00*   (2006.01)
*A61P 31/12*   (2006.01)
*C07K 16/10*   (2006.01)

(52) U.S. Cl.
CPC .......... *C07K 16/1027* (2013.01); *A61P 31/12* (2018.01); *A61K 38/00* (2013.01); *C07K 2317/21* (2013.01); *C07K 2317/76* (2013.01)

(58) Field of Classification Search
CPC ..... A61K 38/00; A61P 31/12; C07K 16/1027; C07K 2317/21; C07K 2317/76
See application file for complete search history.

(56) References Cited

U.S. PATENT DOCUMENTS

2018/0251526 A1*   9/2018   Lobo ............... A61K 39/39591

FOREIGN PATENT DOCUMENTS

| CN | 1902223 A | 1/2007 |
| EP | 1997830 A1 | 12/2008 |
| WO | 2005/066205 A2 | 7/2005 |
| WO | 2018215660 A1 | 11/2018 |

OTHER PUBLICATIONS

Homaira, N. et al. "Effectiveness of Palivizumab in Preventing RSV Hospitalization in High Risk Children: A Real-World Perspective", International Journal of Pediatrics, vol. 2014, pp. 1-13 (Dec. 14, 2014). DOI: 10.1155/2014/571609.
Written Opinion and International Search Report corresponding to International Application No. PCT/EP/2020/060870 mailed Jul. 20, 2020.

* cited by examiner

*Primary Examiner* — Li N Komatsu
*Assistant Examiner* — Mercy H Sabila
(74) *Attorney, Agent, or Firm* — Fox Rothschild LLP; Peter F. Corless

(57) ABSTRACT

The present invention relates to a peptide with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$ (SEQ ID No: 1) as well as to A peptide with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$-$X_{14}$ (SEQ ID No: 2). The present invention further relates to a nanostructure comprising a nucleic acid scaffold and at least two peptide moieties, wherein the sequence of each of the at least two peptide moieties is independently selected from the sequence of the peptide of the invention as well as pharmaceutical compositions, nucleic acids, methods and uses related thereto.

Figure 1:
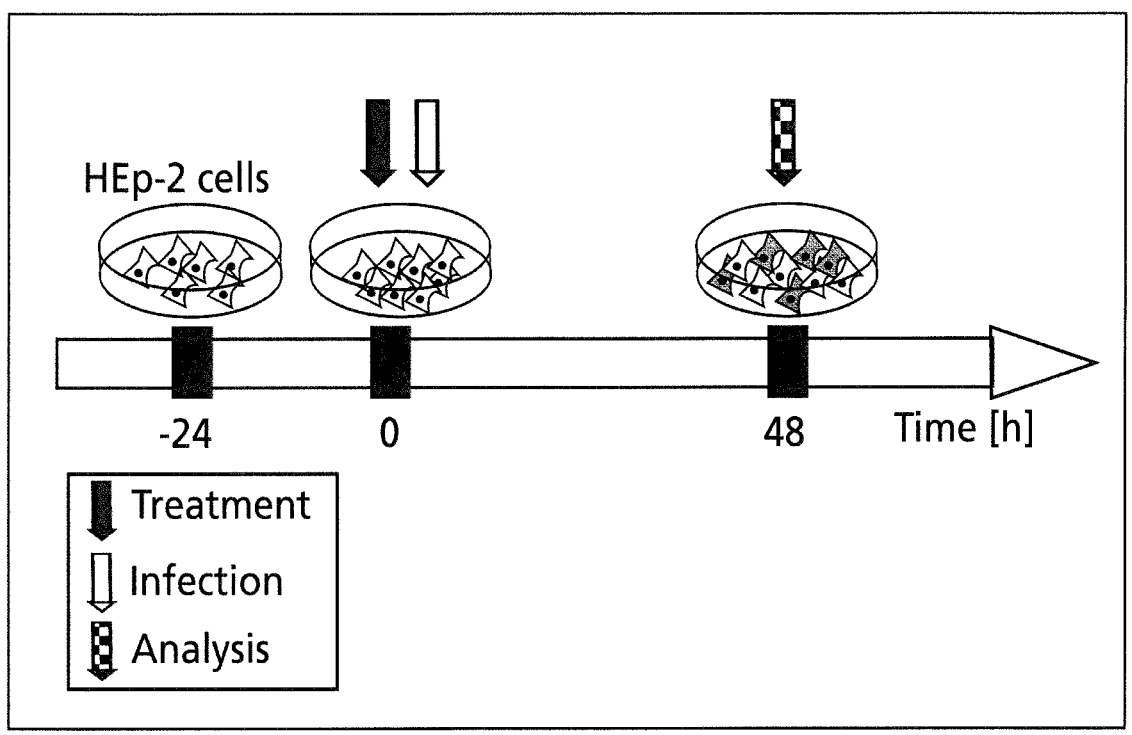

5 Claims, 15 Drawing Sheets
Specification includes a Sequence Listing.

A)

B)

A)

B)

SEQUENCE LISTING

```
<160> NUMBER OF SEQ ID NOS: 46

<210> SEQ ID NO 1
<211> LENGTH: 13
<212> TYPE: PRT
<213> ORGANISM: Artificial Sequence
<220> FEATURE:
```

```
<223> OTHER INFORMATION: Peptide of invention comprising 13 amino acids
<220> FEATURE:
<221> NAME/KEY: SITE
<222> LOCATION: (1)..(1)
<223> OTHER INFORMATION: Leu, Val or Ile, or a non-natural or natural
      analogue thereof
<220> FEATURE:
<221> NAME/KEY: SITE
<222> LOCATION: (2)..(2)
<223> OTHER INFORMATION: Val, or a non-natural or natural analogue
      thereof
<220> FEATURE:
<221> NAME/KEY: SITE
<222> LOCATION: (3)..(3)
<223> OTHER INFORMATION: Val, or a non-natural or natural analogue
      thereof
<220> FEATURE:
<221> NAME/KEY: SITE
<222> LOCATION: (4)..(4)
<223> OTHER INFORMATION: natural or non-natural amino acid
<220> FEATURE:
<221> NAME/KEY: SITE
<222> LOCATION: (5)..(5)
<223> OTHER INFORMATION: natural or non-natural amino acid
<220> FEATURE:
<221> NAME/KEY: SITE
<222> LOCATION: (6)..(6)
<223> OTHER INFORMATION: natural or non-natural amino acid
<220> FEATURE:
<221> NAME/KEY: SITE
<222> LOCATION: (7)..(7)
<223> OTHER INFORMATION: Tyr, or a non-natural or natural analogue
      thereof
<220> FEATURE:
<221> NAME/KEY: SITE
<222> LOCATION: (8)..(8)
<223> OTHER INFORMATION: Leu, Val, or Ile, or a non-natural or natural
      analogue thereof
<220> FEATURE:
<221> NAME/KEY: SITE
<222> LOCATION: (9)..(9)
<223> OTHER INFORMATION: Pro, or a non-natural or natural analogue
      thereof
<220> FEATURE:
<221> NAME/KEY: SITE
<222> LOCATION: (10)..(10)
<223> OTHER INFORMATION: natural or non-natural amino acid
<220> FEATURE:
<221> NAME/KEY: SITE
<222> LOCATION: (11)..(11)
<223> OTHER INFORMATION: natural or non-natural amino acid
<220> FEATURE:
<221> NAME/KEY: SITE
<222> LOCATION: (12)..(12)
<223> OTHER INFORMATION: natural or non-natural amino acid
<220> FEATURE:
<221> NAME/KEY: SITE
<222> LOCATION: (13)..(13)
<223> OTHER INFORMATION: Asp or Glu, or a non-natural or natural
      analogue thereof

<400> SEQUENCE: 1

Xaa Xaa Xaa Xaa Xaa Xaa Xaa Xaa Xaa Xaa Xaa Xaa Xaa
1               5                   10

<210> SEQ ID NO 2
<211> LENGTH: 14
<212> TYPE: PRT
<213> ORGANISM: Artificial Sequence
<220> FEATURE:
<223> OTHER INFORMATION: Peptide of invention comprising 14 amino acids
<220> FEATURE:
<221> NAME/KEY: SITE
<222> LOCATION: (1)..(1)
<223> OTHER INFORMATION: Leu, Val or Ile, or a non-natural or natural
      analogue thereof
<220> FEATURE:
```

```
<221> NAME/KEY: SITE
<222> LOCATION: (2)..(2)
<223> OTHER INFORMATION: Val, or a non-natural or natural analogue
      thereof
<220> FEATURE:
<221> NAME/KEY: SITE
<222> LOCATION: (3)..(3)
<223> OTHER INFORMATION: Val, or a non-natural or natural analogue
      thereof
<220> FEATURE:
<221> NAME/KEY: SITE
<222> LOCATION: (4)..(4)
<223> OTHER INFORMATION: natural or non-natural amino acid
<220> FEATURE:
<221> NAME/KEY: SITE
<222> LOCATION: (5)..(5)
<223> OTHER INFORMATION: natural or non-natural amino acid
<220> FEATURE:
<221> NAME/KEY: SITE
<222> LOCATION: (6)..(6)
<223> OTHER INFORMATION: natural or non-natural amino acid
<220> FEATURE:
<221> NAME/KEY: SITE
<222> LOCATION: (7)..(7)
<223> OTHER INFORMATION: Tyr, or a non-natural or natural analogue
      thereof
<220> FEATURE:
<221> NAME/KEY: SITE
<222> LOCATION: (8)..(8)
<223> OTHER INFORMATION: Leu, Val, or Ile, or a non-natural or natural
      analogue thereof
<220> FEATURE:
<221> NAME/KEY: SITE
<222> LOCATION: (9)..(9)
<223> OTHER INFORMATION: Pro, or a non-natural or natural analogue
      thereof
<220> FEATURE:
<221> NAME/KEY: SITE
<222> LOCATION: (10)..(10)
<223> OTHER INFORMATION: natural or non-natural amino acid
<220> FEATURE:
<221> NAME/KEY: SITE
<222> LOCATION: (11)..(11)
<223> OTHER INFORMATION: natural or non-natural amino acid
<220> FEATURE:
<221> NAME/KEY: SITE
<222> LOCATION: (12)..(12)
<223> OTHER INFORMATION: natural or non-natural amino acid
<220> FEATURE:
<221> NAME/KEY: SITE
<222> LOCATION: (13)..(13)
<223> OTHER INFORMATION: Asp or Glu, or a non-natural or natural
      analogue thereof
<220> FEATURE:
<221> NAME/KEY: SITE
<222> LOCATION: (14)..(14)
<223> OTHER INFORMATION: natural or non-natural amino acid

<400> SEQUENCE: 2

Xaa Xaa Xaa Xaa Xaa Xaa Xaa Xaa Xaa Xaa Xaa Xaa Xaa Xaa
1               5                   10

<210> SEQ ID NO 3
<211> LENGTH: 13
<212> TYPE: PRT
<213> ORGANISM: Artificial Sequence
<220> FEATURE:
<223> OTHER INFORMATION: Reference peptide with 13 amino acids

<400> SEQUENCE: 3

Leu Val Val Ser Thr Thr Tyr Leu Pro His Tyr Phe Asp
1               5                   10

<210> SEQ ID NO 4
<211> LENGTH: 13
```

```
<212> TYPE: PRT
<213> ORGANISM: Artificial Sequence
<220> FEATURE:
<223> OTHER INFORMATION: Peptide of Figure 2

<400> SEQUENCE: 4

Val Val Ser Thr Thr Tyr Leu Pro His Tyr Phe Asp Asn
1               5                   10

<210> SEQ ID NO 5
<211> LENGTH: 14
<212> TYPE: PRT
<213> ORGANISM: Artificial Sequence
<220> FEATURE:
<223> OTHER INFORMATION: Reference peptide with 14 amino acids

<400> SEQUENCE: 5

Leu Val Val Ser Thr Thr Tyr Leu Pro His Tyr Phe Asp Asn
1               5                   10

<210> SEQ ID NO 6
<211> LENGTH: 14
<212> TYPE: PRT
<213> ORGANISM: Artificial Sequence
<220> FEATURE:
<223> OTHER INFORMATION: Peptide of Figure 5

<400> SEQUENCE: 6

Val Val Val Ser Thr Thr Tyr Leu Pro His Tyr Phe Asp Asn
1               5                   10

<210> SEQ ID NO 7
<211> LENGTH: 14
<212> TYPE: PRT
<213> ORGANISM: Artificial Sequence
<220> FEATURE:
<223> OTHER INFORMATION: Peptide of Figure 5

<400> SEQUENCE: 7

Ile Val Val Ser Thr Thr Tyr Leu Pro His Tyr Phe Asp Asn
1               5                   10

<210> SEQ ID NO 8
<211> LENGTH: 14
<212> TYPE: PRT
<213> ORGANISM: Artificial Sequence
<220> FEATURE:
<223> OTHER INFORMATION: Peptide of Figure 5
<220> FEATURE:
<221> NAME/KEY: SITE
<222> LOCATION: (1)..(1)
<223> OTHER INFORMATION: Abu

<400> SEQUENCE: 8

Xaa Val Val Ser Thr Thr Tyr Leu Pro His Tyr Phe Asp Asn
1               5                   10

<210> SEQ ID NO 9
<211> LENGTH: 14
<212> TYPE: PRT
<213> ORGANISM: Artificial Sequence
<220> FEATURE:
<223> OTHER INFORMATION: Peptide of figure 5
<220> FEATURE:
<221> NAME/KEY: SITE
<222> LOCATION: (3)..(3)
<223> OTHER INFORMATION: Chg: 2-amino-2-cyclohexylacetic acid

<400> SEQUENCE: 9
```

```
Leu Val Xaa Ser Thr Thr Tyr Leu Pro His Tyr Phe Asp Asn
1               5                   10
```

<210> SEQ ID NO 10
<211> LENGTH: 14
<212> TYPE: PRT
<213> ORGANISM: Artificial Sequence
<220> FEATURE:
<223> OTHER INFORMATION: Peptide of Figure 5
<220> FEATURE:
<221> NAME/KEY: SITE
<222> LOCATION: (7)..(7)
<223> OTHER INFORMATION: TYR3-I

<400> SEQUENCE: 10

```
Leu Val Val Ser Thr Thr Xaa Leu Pro His Tyr Phe Asp Asn
1               5                   10
```

<210> SEQ ID NO 11
<211> LENGTH: 14
<212> TYPE: PRT
<213> ORGANISM: Artificial Sequence
<220> FEATURE:
<223> OTHER INFORMATION: Peptide of Figure 5
<220> FEATURE:
<221> NAME/KEY: SITE
<222> LOCATION: (1)..(1)
<223> OTHER INFORMATION: Chg: 2-amino-2-cyclohexylacetic acid
<220> FEATURE:
<221> NAME/KEY: SITE
<222> LOCATION: (2)..(2)
<223> OTHER INFORMATION: Cpa: cyano-propionic amino acid
<220> FEATURE:
<221> NAME/KEY: SITE
<222> LOCATION: (7)..(7)
<223> OTHER INFORMATION: TYR3,5-I2

<400> SEQUENCE: 11

```
Xaa Xaa Val Ser Thr Thr Xaa Leu Pro His Tyr Phe Asp Asn
1               5                   10
```

<210> SEQ ID NO 12
<211> LENGTH: 14
<212> TYPE: PRT
<213> ORGANISM: Artificial Sequence
<220> FEATURE:
<223> OTHER INFORMATION: Peptide of Figure 5
<220> FEATURE:
<221> NAME/KEY: SITE
<222> LOCATION: (1)..(1)
<223> OTHER INFORMATION: Chg: 2-amino-2-cyclohexylacetic acid
<220> FEATURE:
<221> NAME/KEY: SITE
<222> LOCATION: (2)..(2)
<223> OTHER INFORMATION: Nle
<220> FEATURE:
<221> NAME/KEY: SITE
<222> LOCATION: (3)..(3)
<223> OTHER INFORMATION: Chg: 2-amino-2-cyclohexylacetic acid

<400> SEQUENCE: 12

```
Xaa Xaa Xaa Ser Thr Thr Tyr Leu Pro His Tyr Phe Asp Asn
1               5                   10
```

<210> SEQ ID NO 13
<211> LENGTH: 17
<212> TYPE: PRT
<213> ORGANISM: Artificial Sequence
<220> FEATURE:
<223> OTHER INFORMATION: Peptide of Figure 2

```
<400> SEQUENCE: 13

Glu Thr Ala Leu Val Val Ser Thr Thr Tyr Leu Pro His Tyr Phe Asp
1               5                   10                  15

Asn

<210> SEQ ID NO 14
<211> LENGTH: 16
<212> TYPE: PRT
<213> ORGANISM: Artificial Sequence
<220> FEATURE:
<223> OTHER INFORMATION: Peptide of Figure 2

<400> SEQUENCE: 14

Thr Ala Leu Val Val Ser Thr Thr Tyr Leu Pro His Tyr Phe Asp Asn
1               5                   10                  15

<210> SEQ ID NO 15
<211> LENGTH: 15
<212> TYPE: PRT
<213> ORGANISM: Artificial Sequence
<220> FEATURE:
<223> OTHER INFORMATION: Peptide of Figure 2

<400> SEQUENCE: 15

Ala Leu Val Val Ser Thr Thr Tyr Leu Pro His Tyr Phe Asp Asn
1               5                   10                  15

<210> SEQ ID NO 16
<211> LENGTH: 16
<212> TYPE: PRT
<213> ORGANISM: Artificial Sequence
<220> FEATURE:
<223> OTHER INFORMATION: Peptide of Figure 2

<400> SEQUENCE: 16

Glu Thr Ala Leu Val Val Ser Thr Thr Tyr Leu Pro His Tyr Phe Asp
1               5                   10                  15

<210> SEQ ID NO 17
<211> LENGTH: 231
<212> TYPE: PRT
<213> ORGANISM: Artificial Sequence
<220> FEATURE:
<223> OTHER INFORMATION: Reference peptide

<400> SEQUENCE: 17

Gln Val Gln Leu Val Gln Ser Gly Ala Glu Val Lys Lys Pro Gly Ser
1               5                   10                  15

Ser Val Met Val Ser Cys Gln Ala Ser Gly Gly Pro Leu Arg Asn Tyr
            20                  25                  30

Ile Ile Asn Trp Leu Arg Gln Ala Pro Gly Gln Gly Pro Glu Trp Met
        35                  40                  45

Gly Gly Ile Ile Pro Val Leu Gly Thr Val His Tyr Ala Pro Lys Phe
    50                  55                  60

Gln Gly Arg Val Thr Ile Thr Ala Asp Glu Ser Thr Asp Thr Ala Tyr
65                  70                  75                  80

Ile His Leu Ile Ser Leu Arg Ser Glu Asp Thr Ala Met Tyr Tyr Cys
                85                  90                  95

Ala Thr Glu Thr Ala Leu Val Val Ser Thr Thr Tyr Leu Pro His Tyr
            100                 105                 110

Phe Asp Asn Trp Gly Gln Gly Thr Leu Val Thr Val Ser Ser Ala Ser
        115                 120                 125
```

Thr Lys Gly Pro Ser Val Phe Pro Leu Ala Pro Ser Ser Lys Ser Thr
        130                 135                 140

Ser Gly Gly Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Ser Leu Gly Thr Gln Thr Tyr Ile
        195                 200                 205

Cys Asn Val Asn His Lys Pro Ser Asn Thr Lys Val Asp Lys Lys Val
    210                 215                 220

Glu Pro Lys Ser Cys Asp Lys
225                 230

<210> SEQ ID NO 18
<211> LENGTH: 12
<212> TYPE: PRT
<213> ORGANISM: Artificial Sequence
<220> FEATURE:
<223> OTHER INFORMATION: Peptide of figure 2

<400> SEQUENCE: 18

Val Ser Thr Thr Tyr Leu Pro His Tyr Phe Asp Asn
1               5                   10

<210> SEQ ID NO 19
<211> LENGTH: 11
<212> TYPE: PRT
<213> ORGANISM: Artificial Sequence
<220> FEATURE:
<223> OTHER INFORMATION: Peptide of figure 2

<400> SEQUENCE: 19

Ser Thr Thr Tyr Leu Pro His Tyr Phe Asp Asn
1               5                   10

<210> SEQ ID NO 20
<211> LENGTH: 10
<212> TYPE: PRT
<213> ORGANISM: Artificial Sequence
<220> FEATURE:
<223> OTHER INFORMATION: Peptide of Figure 2

<400> SEQUENCE: 20

Thr Thr Tyr Leu Pro His Tyr Phe Asp Asn
1               5                   10

<210> SEQ ID NO 21
<211> LENGTH: 9
<212> TYPE: PRT
<213> ORGANISM: Artificial Sequence
<220> FEATURE:
<223> OTHER INFORMATION: Peptide of Figure 2

<400> SEQUENCE: 21

Thr Tyr Leu Pro His Tyr Phe Asp Asn
1               5

<210> SEQ ID NO 22
<211> LENGTH: 8
<212> TYPE: PRT
<213> ORGANISM: Artificial Sequence

```
<220> FEATURE:
<223> OTHER INFORMATION: Peptide of Figure 2

<400> SEQUENCE: 22

Tyr Leu Pro His Tyr Phe Asp Asn
1               5

<210> SEQ ID NO 23
<211> LENGTH: 7
<212> TYPE: PRT
<213> ORGANISM: Artificial Sequence
<220> FEATURE:
<223> OTHER INFORMATION: Peptide of Figure 2

<400> SEQUENCE: 23

Leu Pro His Tyr Phe Asp Asn
1               5

<210> SEQ ID NO 24
<211> LENGTH: 15
<212> TYPE: PRT
<213> ORGANISM: Artificial Sequence
<220> FEATURE:
<223> OTHER INFORMATION: Peptide of Figure 2

<400> SEQUENCE: 24

Glu Thr Ala Leu Val Val Ser Thr Thr Tyr Leu Pro His Tyr Phe
1               5                   10                  15

<210> SEQ ID NO 25
<211> LENGTH: 14
<212> TYPE: PRT
<213> ORGANISM: Artificial Sequence
<220> FEATURE:
<223> OTHER INFORMATION: Peptide of Figure 2

<400> SEQUENCE: 25

Glu Thr Ala Leu Val Val Ser Thr Thr Tyr Leu Pro His Tyr
1               5                   10

<210> SEQ ID NO 26
<211> LENGTH: 13
<212> TYPE: PRT
<213> ORGANISM: Artificial Sequence
<220> FEATURE:
<223> OTHER INFORMATION: Peptide of Figure 2

<400> SEQUENCE: 26

Glu Thr Ala Leu Val Val Ser Thr Thr Tyr Leu Pro His
1               5                   10

<210> SEQ ID NO 27
<211> LENGTH: 12
<212> TYPE: PRT
<213> ORGANISM: Artificial Sequence
<220> FEATURE:
<223> OTHER INFORMATION: Peptide of Figure 2

<400> SEQUENCE: 27

Glu Thr Ala Leu Val Val Ser Thr Thr Tyr Leu Pro
1               5                   10

<210> SEQ ID NO 28
<211> LENGTH: 10
<212> TYPE: PRT
<213> ORGANISM: Artificial Sequence
<220> FEATURE:
```

<223> OTHER INFORMATION: Peptide of Figure 2

<400> SEQUENCE: 28

Glu Thr Ala Leu Val Val Ser Thr Thr Tyr
1               5                   10

<210> SEQ ID NO 29
<211> LENGTH: 9
<212> TYPE: PRT
<213> ORGANISM: Artificial Sequence
<220> FEATURE:
<223> OTHER INFORMATION: Peptide of Figure 2

<400> SEQUENCE: 29

Glu Thr Ala Leu Val Val Ser Thr Thr
1               5

<210> SEQ ID NO 30
<211> LENGTH: 8
<212> TYPE: PRT
<213> ORGANISM: Artificial Sequence
<220> FEATURE:
<223> OTHER INFORMATION: Peptide of Figure 2

<400> SEQUENCE: 30

Glu Thr Ala Leu Val Val Ser Thr
1               5

<210> SEQ ID NO 31
<211> LENGTH: 7
<212> TYPE: PRT
<213> ORGANISM: Artificial Sequence
<220> FEATURE:
<223> OTHER INFORMATION: Peptide of Figure 2

<400> SEQUENCE: 31

Glu Thr Ala Leu Val Val Ser
1               5

<210> SEQ ID NO 32
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 32

Ala Val Val Ser Thr Thr Tyr Leu Pro His Tyr Phe Asp Asn
1               5                   10

<210> SEQ ID NO 33
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 33

Leu Ala Val Ser Thr Thr Tyr Leu Pro His Tyr Phe Asp Asn
1               5                   10

<210> SEQ ID NO 34
<211> LENGTH: 14
<212> TYPE: PRT
<213> ORGANISM: Artificial Sequence
<220> FEATURE:
<223> OTHER INFORMATION: Peptide of Figure 4

```
<400> SEQUENCE: 34

Leu Val Ala Ser Thr Thr Tyr Leu Pro His Tyr Phe Asp Asn
1               5                   10

<210> SEQ ID NO 35
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 35

Leu Val Val Ala Thr Thr Tyr Leu Pro His Tyr Phe Asp Asn
1               5                   10

<210> SEQ ID NO 36
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 36

Leu Val Val Ser Ala Thr Tyr Leu Pro His Tyr Phe Asp Asn
1               5                   10

<210> SEQ ID NO 37
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 37

Leu Val Val Ser Thr Ala Tyr Leu Pro His Tyr Phe Asp Asn
1               5                   10

<210> SEQ ID NO 38
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 38

Leu Val Val Ser Thr Thr Ala Leu Pro His Tyr Phe Asp Asn
1               5                   10

<210> SEQ ID NO 39
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 39

Leu Val Val Ser Thr Thr Tyr Ala Pro His Tyr Phe Asp Asn
1               5                   10

<210> SEQ ID NO 40
<211> LENGTH: 14
<212> TYPE: PRT
<213> ORGANISM: Artificial Sequence
<220> FEATURE:
<223> OTHER INFORMATION: Peptide Figure 4
```

<400> SEQUENCE: 40

Leu Val Val Ser Thr Thr Tyr Leu Ala His Tyr Phe Asp Asn
1               5                   10

<210> SEQ ID NO 41
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 41

Leu Val Val Ser Thr Thr Tyr Leu Pro Ala Tyr Phe Asp Asn
1               5                   10

<210> SEQ ID NO 42
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 42

Leu Val Val Ser Thr Thr Tyr Leu Pro His Ala Phe Asp Asn
1               5                   10

<210> SEQ ID NO 43
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 43

Leu Val Val Ser Thr Thr Tyr Leu Pro His Tyr Ala Asp Asn
1               5                   10

<210> SEQ ID NO 44
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 44

Leu Val Val Ser Thr Thr Tyr Leu Pro His Tyr Phe Ala Asn
1               5                   10

<210> SEQ ID NO 45
<211> LENGTH: 14
<212> TYPE: PRT
<213> ORGANISM: Artificial Sequence
<220> FEATURE:
<223> OTHER INFORMATION: Peptide of Figure 4

<400> SEQUENCE: 45

Leu Val Val Ser Thr Thr Tyr Leu Pro His Tyr Phe Asp Ala
1               5                   10

<210> SEQ ID NO 46
<211> LENGTH: 19
<212> TYPE: PRT
<213> ORGANISM: Artificial Sequence
<220> FEATURE:
<223> OTHER INFORMATION: Peptide of Figure 8

<400> SEQUENCE: 46

```
Cys Glu Thr Ala Leu Val Val Ser Thr Thr Tyr Leu Pro His Tyr Phe
1               5                   10                  15
Asp Asn Cys
```

BIOLOGICAL AND SYNTHETIC MOLECULES INHIBITING RESPIRATORY SYNCYTIAL VIRUS INFECTION

CROSS-REFERENCE TO RELATED APPLICATIONS

This Application is a national stage application under 35 U.S.C. § 371 of International Patent Application No. PCT/EP2020/060870, filed Apr. 17, 2020, which claims the benefit of and priority to German Application No. 10 2019 110 314.2, filed Apr. 18, 2019, the entire contents of which are hereby expressly incorporated by reference herein.

INCORPORATION BY REFERENCE OF SEQUENCE LISTING

The content of the text file named "049839-513N01US Sequence listing.TXT", which was created on Apr. 17, 2020 and is 15,848 bytes in size, is hereby incorporated by reference in its entirety.

The present invention relates to a peptide with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$ (SEQ ID No: 1) as well as to a peptide with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$-$X_{14}$ (SEQ ID No: 2). The present invention further relates to a nanostructure comprising a nucleic acid scaffold and at least two peptide moieties, wherein the sequence of each of the at least two peptide moieties is independently selected from the sequence of the peptide of the invention as well as pharmaceutical compositions, nucleic acids, methods and uses related thereto.

Respiratory syncytial virus (RSV) is an enveloped negative-sense single-stranded RNA virus of the family Pneumoviridae (genus Orthopneumovirus). RSV has a double layer lipid envelope, in which glycoproteins are embedded, including a Fusion (F) glycoprotein and an Adhesion (G) glycoprotein. There are two subgroups of RSV, A and B, which differ in the structure of the antigen of the Adhesion (G) glycoprotein. The Adhesion (G) glycoprotein is responsible for the specific adsorption of the virus particle onto the cell surface. During the entry of the virus into a host cell, the Fusion (F) glycoprotein induces fusion of viral and cellular membranes leading to delivery of the nucleocapsid into the cytoplasm. The Fusion (F) glycoprotein further interacts directly with heparan sulfate and may participate in virus attachment to the host cell.

The Fusion (F) glycoprotein is synthesized as a precursor polypeptide $F_0$ and has at the N-terminal end, a signal peptide for the transport of the translocation complex to the membrane of the endoplasmic reticulum. After the amino acid chain is fed through the membrane, a hydrophobic sequence at the C-terminal end effects the anchoring of the $F_0$ protein in the membrane and the signal peptide is cleaved off. Following this, the protein is glycosylated during its transport through the Golgi apparatus. A cleavage of the $F_0$ protein into the amino terminal $F_2$ part and the $F_1$ protein also takes place in the Golgi apparatus. The cleavage site lies between a segment of basic amino acids and a hydrophobic domain. This hydrophobic domain of about 25 amino acids in length forms, after the cleavage, the N-terminus of the $F_1$ protein and mediates the merging of the viral with the cellular membrane following absorption. The $F_2$ protein remains connected to the $F_1$ protein via a disulfide bridge.

After cleavage, the functional Fusion (F) glycoprotein in the virion membrane stays in a metastable prefusion conformation, presumably until the virus binds to the host cell membrane. The Fusion (F) glycoprotein is then activated to initiate a series of conformational changes so that fusion occurs. After fusion, F acquires a highly stable postfusion conformation.

RSV is a worldwide spread pathogen. It leads to infections of the respiratory tract, especially affecting the mucosa of the upper airways as well as the ciliated epithelium of the trachea and bronchia. Virus replication takes place in the ciliated epithelial cells of the mucous membranes of the respiratory tract. The epithelial cells are reversibly damaged by syncytia formation caused by the Fusion (F) glycoprotein and the body's own immune reaction. RSV infections may be transmitted by smear infection or droplet infection. Infection with RSV is highly contagious; in a milliliter of saliva there exist up to $10^6$ infectious virus particles. Incubation period is about 2 to 8 days. Infection with respiratory syncytial virus can vary from asymptomatic cases in healthy adults to serious complications in premature infants, immunocompromised patients and elderly. RSV is a leading cause of hospitalization due to acute lower respiratory infection especially in infants and young children. It is estimated that the number of RSV-associated acute lower respiratory infection is about 33 million per year, resulting in more than 3 million hospitalizations and 59,600 in-hospital deaths in children under 5 years of age.

No effective antiviral therapy against RSV is currently available. Treatment mainly involves symptom management and supportive care. Inhaled corticosteroids might be helpful in reducing RSV associated bronchiolitis symptoms. Ribavirin, a nucleoside analogue that blocks viral replication, is prescribed in severe cases of RSV infection, but has little or no significant effect on reduction of RSV load. Besides, ribavirin is very expensive, has teratogenic effects in animals and cannot be taken in pregnancy (Ganz 2009).

In case of prevention of an RSV infection, Palivizumab (Synagis®, licensed in 1998) is the first and only commercially available product for the prophylaxis of RSV. It is a humanized monoclonal antibody that binds to Fusion (F) glycoprotein of RSV and prevents viral infection of host cells. Palivizumab is used exclusively for seasonal immunoprophylaxis of RSV infection in populations with high risk for severe illness including premature infants and those suffering from chronic pulmonary disease. Palivizumab has limitations in clinical applications due to its high costs (five doses of Palivizumab for a 5 kg infant cost approximately $5600) and requirement of repetitive administrations (IAN 1998; Homaira et al. 2014). As with most antibodies in the medical field, the production is cost-intensive and complicated. Consequently, it is only available for high risk patients in industrialized countries. Until now, there is neither an effective vaccine nor a treatment for RSV infections.

Despite research efforts since the discovery of RSV, no low-cost prophylactic or therapeutic approach has been developed. The disappointing results from the first RSV vaccine clinical trial with formalin-inactivated RSV (FI-RSV), that caused enhanced respiratory disease instead of providing protection, slowed RSV vaccine development (Kapikian et al. 1969). Many other attempts for the development of effective vaccines or antibodies against RSV failed to confer protection either at preclinical or clinical stages.

Therefore, there is a so far unmet medical need for novel clinical and cost-effective antiviral agents against RSV. The missing of reliable treatment of RSV infection remains a significant problem worldwide.

The problem is solved by the peptide of the invention with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$ (SEQ ID No: 1) as well as to the peptide of the invention with a length of 25 amino acids or less comprising the sequence $X_1$-$X_2$-$X_3$-$X_4$-$X_5$-$X_6$-$X_7$-$X_8$-$X_9$-$X_{10}$-$X_{11}$-$X_{12}$-$X_{13}$-$X_{14}$ (SEQ ID No: 2). The problem is further solved by the nanostructure of the invention comprising a nucleic acid scaffold and at least two peptide moieties, wherein the sequence of each of the at least two peptide moieties is independently selected from the sequence of the peptide of the invention as well as pharmaceutical compositions, nucleic acids, methods and uses related thereto.

The novel peptide inhibitors of RSV show in vitro and in vivo efficacy. It was demonstrated that the intranasal delivery of these peptides results in significant reduction of viral load in infected mice. For the approach of the invention, a neutralizing epitope (Ø) was chosen as a target and a computational method was used to design several peptide inhibitors of RSV fusion. The designed peptides bind specifically to the Ø site of the prefusion conformation of F protein and prevent its transition into the postfusion state. After binding, F protein cannot perform its fusion function anymore, and thus RSV infection of the host cell can be blocked.

The invented novel and highly selective short synthetic peptides may be utilized as prophylactic and/or therapeutic agents against RSV infection. The peptides may be used either alone or in combinations with other viral inhibitors targeting the same or different proteins of RSV. To increase binding efficacy, the peptides can be, in one embodiment, be conjugated to nucleic acid nanostructures of the invention, such as DNA nanostructures. Those nanostructures may function as scaffold material and in contrast to common antibodies, the number of binding sites (peptides) and distances between them may be variable. Since RSV-F is a trimeric surface protein, a three-armed DNA nanostructure is preferably be chosen and modified with three new RSV-F binding peptides, but also other arrangements are possible. Since the persistence length of DNA may be 50 nm, the arms can be stiff. However, the center junction may be flexible and varied by incorporating unpaired bases, for example 3 or 5 extra thymines. In addition, the attachment of such peptides to DNA may improve their solubility and stability against proteases.

The peptides of the invention can serve as cost-effective alternative to the monoclonal antibody palivizumab—the so far only available prophylaxis against RSV. The prophylaxis with the peptides of the present invention and the nanostructure of the present invention offers an attractive strategy for the prevention of RSV infection in high-risk populations.

The peptides of the present invention offer a variety of advantages. The mechanism of antiviral action of peptides involves preventing the fusion of RSV with target cell membrane by capturing RSV-F protein in its metastable prefusion conformation, thus making them suitable for RSV prophylaxis. Further, the targeting of RSV surface glycoprotein (F) by the peptides reduces undesirable side-effects. Moreover, short peptide sequences in the peptides of the invention offer a simpler and less expensive production opportunity than antibodies or proteins. Also, the peptides are safer and less toxic than synthetic molecules, and peptides are more stable than antibodies at different storage conditions. Further, the demonstrated in vivo efficacy after intranasal administration allows for non-invasive delivery of peptides directly to the site of action. This will minimize side-effects, decrease required doses and make the application outside hospital settings possible.

In addition, the peptides can be used in a combination with other antivirals to achieve synergetic effects.

In the examples, to enhance their antiviral activity, three of those peptides are conjugated to three-armed DNA structures to achieve multivalent binding.

The peptides of the invention exhibit an advantageous linear short sequence and show specific activity against RSV while still allowing modifications at multiple positions such as, e.g. by binding to a nucleic acid scaffold and/or substituting amino acids by non-natural amino acids, thereby protecting them against degradation in vivo or in vitro.

In particular, the peptides and nanostructures of the present invention are useful for inhibiting RSV entry into mammalian cells. In one preferred embodiment, the peptides and nanostructures of the present invention are useful for inhibiting RSV entry into mammalian cells in vitro. In one preferred embodiment, the peptides and nanostructures of the present invention are useful for inhibiting RSV entry into mammalian cells in vivo.

Further the peptides and nanostructures of the present invention are useful for inhibiting RSV spreading. In one preferred embodiment, the peptides and nanostructures of the present invention are useful for inhibiting RSV spreading in mammalian cells in vitro. In one preferred embodiment, the peptides and nanostructures of the present invention are useful for inhibiting RSV spreading in mammals in vivo.

In one embodiment, the present invention relates to a peptide with a length of 25 amino acids or less comprising the sequence $$\text{(SEQ ID No: 1)}$$
$$X_1 - X_2 - X_3 - X_4 - X_5 - X_6 - X_7 - X_8 - X_9 - X_{10} - X_{11} - X_{12} - X_{13}$$

wherein
$X_1$ is Leu, Val or Ile, or a non-natural or natural analogue thereof,
$X_2$ is Val, or a non-natural or natural analogue thereof,
$X_3$ is Val, or a non-natural or natural analogue thereof,
$X_4$ is a natural or non-natural amino acid,
$X_5$ is a natural or non-natural amino acid,
$X_6$ is a natural or non-natural amino acid,
$X_7$ is Tyr, or a non-natural or natural analogue thereof,
$X_8$ is Leu, Val, or Ile, or a non-natural or natural analogue thereof,
$X_9$ is Pro, or a non-natural or natural analogue thereof,
$X_{10}$ is a natural or non-natural amino acid,
$X_{11}$ is a natural or non-natural amino acid,
$X_{12}$ is a natural or non-natural amino acid,
$X_{13}$ is Asp or Glu, or a non-natural or natural analogue thereof,
and wherein at least one amino acid in the sequence pursuant to SEQ ID No: 1 is different from the amino acid in the sequence LVVSTTYLPHYFD (SEQ ID No: 3) at the corresponding position,
or a peptidomimetic or retro-inverso peptide thereof.

The term "peptide" may be understood in the broadest sense as a chain of amino acid monomers linked by peptide bonds.

The term "peptidomimetic" may be understood in the broadest sense as any mimic of a peptide that has similar properties like a peptide, but typically bears higher (biological) stability. Examples for peptidomimetics in the sense of the present invention are such molecular structures partly or completely based on beta amino acid moieties, N-acetylated amino acid moieties (e.g., N-methylated amino acid moieties) and peptoids (i.e., poly-N-substituted glycinyl moieties). Preferably, if the peptide is a peptidomimetic, all amino acid moieties of the peptide are amino acid analogues of one type (e.g. all are on beta amino acid moieties, all are N-acetylated amino acid moieties or all are N-substituted glycinyl moieties). Likewise, if the peptide is a D-peptide analogue, all amino acid moieties of the sequence are D-amino acid moieties.

The term "retro-inverso peptide" will be unambiguously understood by those skilled in the art. In a retro-inverso peptide, the respective sequence is reversed and D-amino acid moieties are used instead of L-amino acid moieties.

Such peptide or immunogenic peptidomimetic or retro-inverso thereof comprising the sequence of SEQ ID No: 1 has a length of 25 amino acids or less and may preferably have a length of 20 amino acids or less, more preferably 15 amino acids or less and most preferably 13 amino acids or less. For example, the length of the peptide may be 25, 24, 23, 22, 21, 20, 19, 18, 17, 16, 15, 14 or 13 amino acids. Preferably, the peptide or immunogenic peptidomimetic or retro-inverso thereof comprising the sequence of SEQ ID No: 1 has a length of between 13 and 25, 13 and 20, 13 and 19, 13 and 18, 13 and 15, 14 and 25, 14 and 20, 14 and 19, or 14 to 16 amino acids.

The term "amino acid" in its broadest sense is understood to comprise organic compounds containing at least one amine (~NH2) and at least one carboxyl (—COOH) functional group, along with a side chain (R group) specific to each amino acid. Further, the term "amino acid" in its broadest sense is understood to comprise natural and non-natural amino acids. The single letter and three letter codes of the amino acid used herein, if not indicated otherwise, are those usually used and well known to the person skilled in the art.

The term "natural amino acid" in its broadest sense is understood to comprise proteinogenic amino acids, further amino acids that are known to occur naturally in proteins, but are not proteinogenic, as well as amino acids, which occur naturally, but are usually not found in proteins. In a preferred embodiment, the natural amino acid is a proteinogenic amino acid.

Proteinogenic amino acids usually are used by the translational machinery to assemble proteins and known to the person skilled in the art, such as alanine, cysteine, aspartic acid, glutamic acid, phenylalanine, glycine, histidine, isoleucine, lysine, leucine, methionine, asparagine, pyrrolysine, proline, glutamine, arginine, serine, threonine, selenocysteine, valine, tryptophan and tyrosine.

As used throughout the present invention, the term "is a natural amino acid" may be understood in the broadest sense as that any amino acid belonging to the group of natural amino acids defined above may be placed at this position.

The term "non-natural amino acid" in its broadest sense is understood to comprise amino acids that originate from synthesizing in laboratory and do not occur naturally. Non-natural amino acids are well known to the person skilled in the art. For example, they may comprise D-amino acids, homo amino acids, beta-homo amino acids, N-methyl amino acids, alpha-methyl amino acids and/or non-natural side chain variant amino acids.

Preferably, non-natural and natural analogues of amino acids which are used in medicinal chemistry and which can be used according to the present invention are summarized in Blaskovich M. A. T. (Unusual Amino Acids in Medicinal Chemistry; J. Med. Chem. 2016, 59, 10807-10836. DOI: 10.1021/acs.jmedchem.6b00319), the content of which is hereby incorporated by reference.

Suitable non-natural amino acids are, for example, 2-aminobutyric acid (2-Abu), 2-amino-2-cyclohexylgylcine (Chg), cyclopropyl-alanine (Cpa), norleucine (Nle), homoleucine (Hle), β-Cyclohexylalanine (Cha), propargylglycine (Pra), norvaline (Nva), α-aminoisobutyric acid (Aib), 1-aminocyclopropanecarboxylic acid (Acpc), Homophenylalanin (HoPhe), phenylglycine (PhG), 3-iodo-tyrosine (Tyr3-I), 3,5-diiodo-tyrosine (Tyr3,5-I2), homotyrosine (hTyr), 4-methoxyhomotyrosine (hTyr-Me), 6-carboxy-lysine (6-cl), N(6)-acetyl-lysine (Aly), cysteine-S-dioxide (csd), selenocysteine (cse), hydroxyl-cysteine (cso), 3-sulfino-alanine (csw), 4-methyl-histidine (hic), 3-hydroxy-proline (3hyp), 4-hydroxy-proline (4hyp), 5-hydroxy-proline (5hyp), 4-oxopyrrolidine-2-carboxylic, kynurenine (kyn), cycloserine, N-trimethyl-lysine (N3l), N-dimethyl lysine (mlz), selenomethionine (mse), 3-nitrotyrosine (3-NO2), 3-aminobicyclo[2.2.1]-heptane-2-carboxylic acid, 3-aminobicyclo[2.2.1]hept-5-ene-2-carboxylic acid, 2-aminocycloheptane carboxylic acid, 6-amino-3-cyclohexene-1-carboxylic acid, 2-Amino-2-methylcyclohexanecarboxylic acid, 2-(amino)octanedioic acid, (2-indanyl)-glycine, pentafluoro-phenylalanine, 2-bromo-phenylalanine, 4-bromo-phenylalanine, 2-chloro-phenylalanine, 3-chloro-phenylalanine, 4-chloro-phenylalanine, 2,4-dichloro-phenylalanine, 3,4-dichloro-phenylalanine, 2-fluoro-phenylalanine, 3-fluoro-phenylalanine, 4-fluoro-phenylalanine, 3,4-diflouro-phenylalanine 3,5-diflouro-phenylalanine, 2-cyanophenylalanine, 3-cyano-phenylalanine, 2-methyl-phenylalanine, 3-methyl-phenylalanine, 4-methyl-phenylalanine, 4-amino-phenylalanine, 2-nitro-phenylalanine, 4-nitro-phenylalanine, β-(2-quinolyl)-alanine, β-(4-thiazolyl)-alanine, β-(2-thienyl)-alanine, N-(4-aminobutyl)-glycine, 2-methoxy-phenylalanine, 4-methoxy-phenylalanine, 1-aminocyclobutane carboxylic acid, 1-(amino)cyclohexane carboxylic, 1-(amino)cyclopropane carboxylic acid, 2-Amino-1,2,3,4-tetrahydronaphthalene-2-carboxylic acid, allyl-glycine, cyclopropyl-glycine, 2-thienyl-glycine, 3-thienyl-glycine, cyclohexyl-glycine, 3-[3,4-bis(trifluoromethyl)phenyl]-alanine, 4-tert-butyl-phenylalanine, 2-(triflourmethyl)-phenylalanine, 3-(triflourmethyl)-phenylalanine, 4-(triflourmethyl)-phenylalanine, β-phenyl-phenylalanine, 5-fluoro-tryptophan, 5-hydroxy-tryptophan, 5-methoxy-tryptophan, and 5-methyl-tryptophan.

As used throughout the present invention, the term "is a non-natural amino acid" may be understood in the broadest sense that any amino acid belonging to the group of non-natural amino acids defined above may be placed at this position.

As used throughout the present invention, the term "or a non-natural or natural analogue thereof" may be understood in the broadest sense that the amino acid at the corresponding position may be substituted by any amino acid of similar physicochemical properties belonging to the group of non-natural or natural amino acids as defined above. However, substitutions may also be performed independent of the physicochemical properties.

For example, in case of the substitution of Leu, Val or Ile by a non-natural or natural analogue thereof, the analogue may be any non-natural or natural amino acid having similar physicochemical properties, such as a comparable size of the amino acid residues or a comparable hydrophobic content within the amino acid residue, or combinations thereof. However, substitutions of Leu, Val or Ile may also be performed independent of the physicochemical properties.

In a preferred embodiment, a natural analogue of Leu is a bulky, hydrophobic, aliphatic amino acid, more preferably selected from Val and Ile. In another preferred embodiment, a natural analogue of Val is a bulky, hydrophobic, aliphatic amino acid, more preferably selected from Leu and Ile. In another preferred embodiment, a natural analogue of Ile is a bulky, hydrophobic, aliphatic amino acid, more preferably selected from Val and Leu.

Preferably a non-natural analogue of Val and Leu is independently selected from a hydrophobic non-natural amino acid. For example, a non-natural analogue of Val, Ile or Leu may independently be selected from 2-Abu, Nle, Chg and Cpa, as demonstrated in the examples.

More preferably
- a non-natural analogue of Val is independently selected from Nle, Hle, Cha, Pra, Nva, Aib, Acpc, ABu, Bug, Chg, Cpa, HoPhe, and PhG,
- a non-natural analogue of Leu is independently selected from Chg, Nle, Hle, Cha, Pra and Cpa, and/or
- a non-natural analogue of Tyr is independently selected from Tyr3-I and Tyr3,5-I2.

For example, in case of the substitution of Val by a non-natural or natural analogue thereof, the analogue may be any non-natural or natural amino acid having similar physicochemical properties, such as a comparable size of the amino acid residue or a comparable hydrophobic content within the amino acid residue, or combinations thereof. However, substitution of Val may also be performed independent of the physicochemical properties.

For example, in case of the substitution of Tyr by a non-natural or natural analogue thereof, the analogue may be any non-natural or natural amino acid having similar physicochemical properties, such as a comparable size of the amino acid residue or a comparable hydrophilic or aromatic content within the amino acid residue, or combinations thereof. However, substitution of Tyr may also be performed independent of the physicochemical properties. For example, Tyr3-I or Tyr3,5-I2 may be used as a non-natural analogue. For example, Phe may be used as natural analogue of Tyr.

For example, in case of the substitution of Pro by a non-natural or natural analogue thereof, the analogue may be any non-natural or natural amino acid having similar physicochemical properties, such as a comparable size of the amino acid residue or a comparable hydrophobic or hydrophilic content within the amino acid residue, or combinations thereof. However, substitution of Pro may also be performed independent of the physicochemical properties. For example, hydroxyproline may be used as analogue of Pro. Non-natural analogues of Pro are known in the art. Preferably, a non-natural analogue of Pro is independently selected from the following (Pro is shown for illustrative purposes):

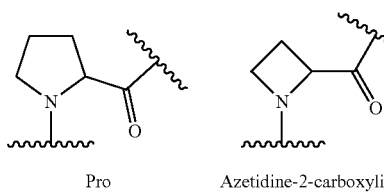

Pro     Azetidine-2-carboxylic Acid

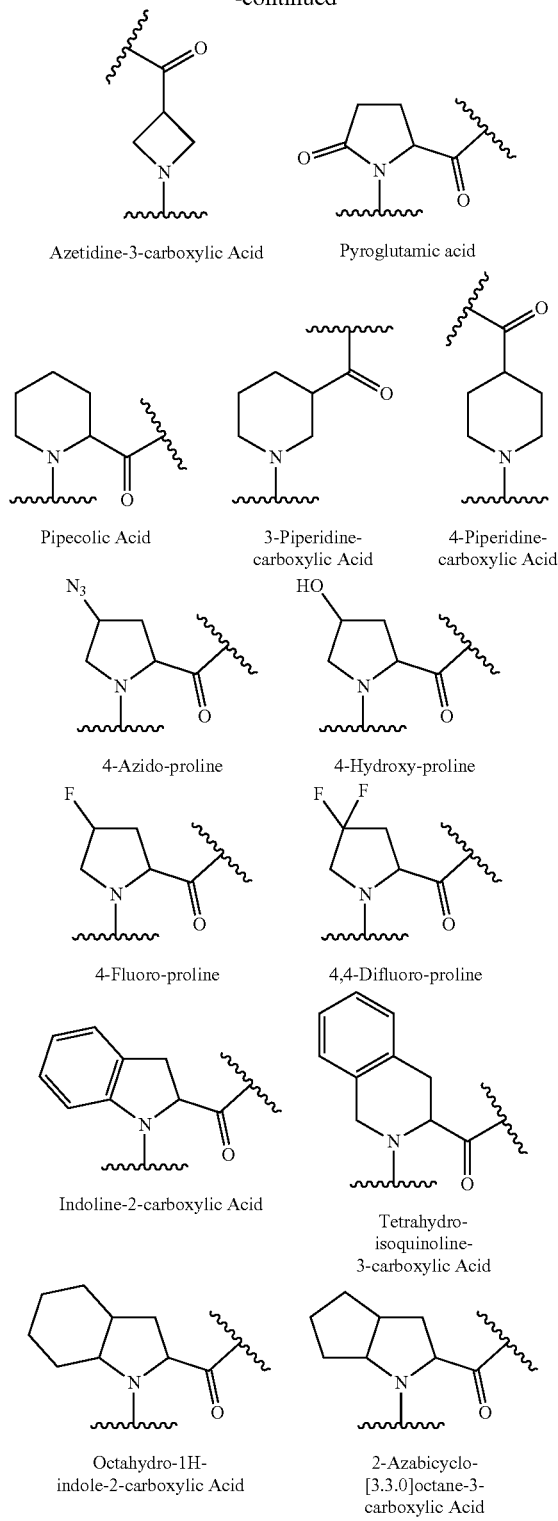

Azetidine-3-carboxylic Acid     Pyroglutamic acid

Pipecolic Acid     3-Piperidine-carboxylic Acid     4-Piperidine-carboxylic Acid 4-Azido-proline     4-Hydroxy-proline 4-Fluoro-proline     4,4-Difluoro-proline Indoline-2-carboxylic Acid     Tetrahydro-isoquinoline-3-carboxylic Acid Octahydro-1H-indole-2-carboxylic Acid     2-Azabicyclo-[3.3.0]octane-3-carboxylic Acid For example, in case of the substitution of Asp or Glu by a non-natural or natural analogue thereof, the analogue may be any non-natural or natural amino acid having similar physicochemical properties, such as a comparable size of the amino acid residue or a comparable hydrophilic or acidic content within the amino acid residue, or combinations thereof. However, substitution of Asp or Glu may also be performed independent of the physicochemical properties. Non-natural analogues of Asp and Glu are known in the art. Preferably, a non-natural analogue of Asp or Glu is independently selected from alpha-methyl aspartic acid, gamma-carboxy-glutamic acid, homoglutamic acid and 2-amino-heptanedioic acid. More preferably, a non-natural analogue of Asp is alpha-methyl aspartic acid. Further, more preferably, a non-natural analogue of Glu is independently selected from gamma-carboxy-glutamic acid, homoglutamic acid and 2-amino-heptanedioic acid. The structures of these non-natural analogues of Glu and Asp as well as the structures of Asp and Glu are shown below:

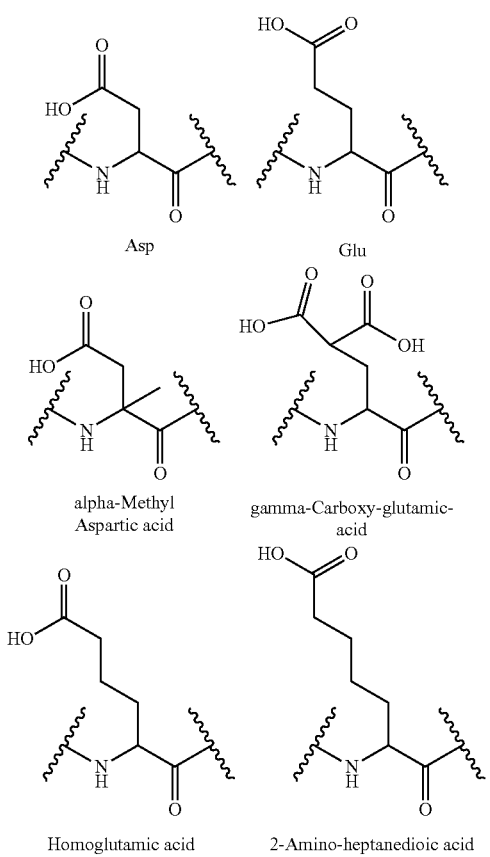

Further, these analogues may be structural and/or functional analogues, whereby structural analogues may be understood in the broadest sense as structures having a similar structure as the replaced amino acid, but differing from it in respect to a certain component. Functional analogues may be understood in the broadest sense as structures having similar physical, chemical or biochemical properties.

As used throughout the present invention, the term "replaced by a non-natural or natural analogue" may be understood in the broadest sense as at least one amino acid being substituted by any amino acid belonging to the group of non-natural or natural amino acids as defined above. The non-natural or natural analogue may have similar physicochemical properties, but it is also possible that the non-natural or natural analogue may not have similar physicochemical properties. For example, substitutions may also be performed independent of the physicochemical properties as described in case of Val and Leu above. The analogues may further be structural and/or functional analogues.

Similar physicochemical properties may, for example, comprise a comparable size of the amino acid residues, a comparable hydrophobic or hydrophilic content or a comparable content of acidic or basic components within the amino acid residue, or combinations thereof. Further, similar physicochemical properties may also comprise the similar arrangement of the above-mentioned hydrophobic or hydrophilic content or the acidic or basic components.

For example, "replaced by a non-natural or natural analogue" may have the meaning that a non-polar amino acid may be substituted by another non-polar amino acid, in particular an aliphatic bulky non-polar amino acid may be substituted by an other aliphatic bulky non-polar amino acid and an aromatic non-polar amino acid may be substituted by another aromatic non-polar amino acid. In this context, a non-polar amino acid may be selected from the group consisting of G (Gly), A (Ala), V (Val), P (Pro), L (Leu), I (Ile), M (Met), W (Trp) and F (Phe). An aliphatic non-polar amino acid may be selected from the group consisting of G (Gly), A (Ala), V (Val), P (Pro), L (Leu), I (Ile), and M (Met). A bulky aliphatic non-polar amino acid may be selected from the group consisting of V (Val), L (Leu), I (Ile), and M (Met). An aromatic non-polar amino acid may be selected from the group consisting of W (Trp) and F (Phe).

For example, "replaced by a non-natural or natural analogue" may also have the meaning that a polar (uncharged) amino acid may be substituted by another polar (uncharged) amino acid, in particular an aliphatic polar (uncharged) amino acid may be substituted by another aliphatic polar (uncharged) amino acid. In this context, a polar (uncharged) amino acid may be selected from the group consisting of S (Ser), T (Thr), Y (Tyr), C (Cys), N (Asn), U (Sec, selenocysteinyl), O (Pyl, pyrrolysinyl) and Q (Gln). An aliphatic polar (uncharged) amino acid may be selected from the group consisting of S (Ser), T (Thr), C (Cys), N (Asn), U (Sec), O (Pyl) and Q (Gln). Preferably, S (Ser) may be replaced by T (Thr) and vice versa and Q (Gln) may be replaced by N (Asn) and vice versa.

For example, "replaced by a non-natural or natural analogue" may also have the meaning that a basic amino acid may be substituted by another basic amino acid. In this context, a basic amino acid may be selected from the group consisting of K (Lys), R (Arg) and H (His). Preferably, K (Lys) may be replaced by R (Arg) and vice versa.

For example, "replaced by a non-natural or natural analogue" may also have the meaning that an acidic amino acid may be substituted by another acidic amino acid. In this context, an acidic amino acid may be selected from the group consisting of D (Asp) and E (Glu).

For example, "replaced by a non-natural or natural analogue" may also have the meaning that a polar amino acid including interactions of the opposite charge may be substituted comparable amino acids. Such amino acids which are exchangeable by one another may be selected from the group consisting of S (Ser), T (Thr), Y (Tyr), C (Cys), N (Asn), Q (Gln), K (Lys), R (Arg), H (His), U (Sec), O (Pyl), D (Asp) and E (Glu).

For example, "replaced by a non-natural or natural analogue" may also have the meaning that a small-sized amino acid may be replaced by another small-sized amino acid. In this context, a small-sized amino acid may be selected from the group consisting of A (Ala), G (Gly) and S (Ser).

For example, "replaced by a non-natural or natural analogue" may also have the meaning that an at least partly polar amino acid may be substituted by another at least partly polar amino acid, in particular an aliphatic at least partly polar amino acid may be substituted by another aliphatic at least partly polar amino acid and an aromatic at least partly polar amino acid may be substituted by another aromatic at least partly polar amino acid. An aromatic at least partly polar amino acid may be selected from the group consisting of Y (Tyr), W (Trp) and F (Phe).

The term "wherein at least one amino acid in the sequence pursuant to SEQ ID No: 1 is different from the amino acid in the sequence LVVSTTYLPHYFD (SEQ ID No: 3) at the corresponding position" may be understood in the broadest sense that the sequence pursuant to SEQ ID No: 1 has at least at one of its positions $X_1$ to $X_{13}$ an amino acid, that is not the same amino acid as the amino acid at the corresponding position in the sequence LVVSTTYLPHYFD (SEQ ID No: 3). Both amino acids may not be the same, if their amino acid residues differ in any kind of feature, such as different functional groups, different molecular structure, different arrangement of functional groups, different chemical bonding, etc. In particular, the differing amino acid may, independently, be a deletion, substitution or insertion. In a preferred embodiment, the differing amino acid is a substitution, such as, independently, a substitution by a different natural or non-natural amino acid, or natural or non-natural analogue of the amino acid.

If only one amino acid of SEQ ID No: 1 is different from its corresponding position of the sequence of SEQ ID No. 3, it may be an amino acid at any position selected from $X_1$ to $X_{13}$. In this case, preferably, the one amino acid of SEQ ID No: 1, which differs from the corresponding position of the sequence of SEQ ID No. 3, may be at any position selected from $X_1$, $X_2$, $X_3$, $X_6$, $X_7$, $X_8$, $X_9$, $X_{11}$, $X_{12}$ and $X_{13}$, more preferably at any position selected from $X_1$, $X_2$, $X_3$, $X_7$, $X_8$, $X_9$, $X_{12}$ and $X_{13}$, yet more preferably at any position selected from $X_1$, $X_2$, $X_3$, $X_7$, $X_8$, $X_9$ and $X_{13}$ and most preferably at any position selected from $X_1$, $X_3$, $X_7$, and $X_{13}$.

If two or more amino acids of SEQ ID No: 1 differ from their corresponding positions of the sequence of SEQ ID No. 3, these may be at any combination of the positions selected from $X_1$ to $X_{13}$. Preferably, the two or more amino acids of SEQ ID No: 1, which differ from the corresponding positions of the sequence of SEQ ID No. 3 may be at any combination of the positions selected from $X_1$, $X_2$, $X_3$, $X_6$, $X_7$, $X_8$, $X_9$, $X_{11}$, $X_{12}$ and $X_{13}$, more preferably at any combination of the positions selected from $X_1$, $X_2$, $X_3$, $X_7$, $X_8$, $X_9$, $X_{12}$ and $X_{13}$, yet more preferably at any combination of the positions selected from $X_1$, $X_2$, $X_3$, $X_7$, $X_8$, $X_9$ and $X_{13}$ and most preferably at any combination of the positions selected from $X_1$, $X_3$, $X_7$, and $X_{13}$.

In general, at least 1, 2, 3, 4, 5, 6, 7, 8, 9, 10, 11, 12 or 13 amino acid(s) of SEQ ID No: 1 may differ from the corresponding position of the sequence of SEQ ID No. 3. Preferably, at least 1 to 10, more preferably 1 to 8, yet more preferably 1 to 7 and most preferably 1 to 4 amino acids of SEQ ID No: 1 may differ from the corresponding position of the sequence of SEQ ID No. 3.

However, it is understood that one or more amino acids in the peptide with the sequence of SEQ ID No: 1 may be identical to the corresponding position of the sequence of SEQ ID No. 3. For example, at least 1, 2, 3, 4, 5, 6, 7, 8, 9, 10, 11 or 12 amino acid(s) of SEQ ID No: 1 may be identical to the corresponding position of the sequence of SEQ ID No. 3. Preferably, at most 1 to 10, more preferably 1 to 8, yet more preferably 1 to 7 and most preferably 1 to 4 amino acids of SEQ ID No: 1 are identical to the corresponding position of the sequence of SEQ ID No. 3.

Preferably, the amino acids N-terminal and/or C-terminal to the sequence pursuant to SEQ ID No: 1 i) correspond to the sequence of SEQ ID No: 17, or ii) correspond to a sequence heterologous thereto.

A "sequence heterologous" as used herein, in the broadest meaning, may be one that is modified from its original form, which is the sequence of SEQ ID No: 17. Modifications of the heterologous sequence may occur by, e.g., site-directed mutagenesis, or by adding heterologous amino acids in the chemical synthesis.

The sequence of SEQ ID No: 17 is shown below.

```
                                                              (SEQ ID NO: 17)
QVQLVQSGAE  VKKPGSSVMV  SCQASGGPLR  NYIINWLRQA  PGQGPEWMGG  IIPVLGTVHY    60

APKFQGRVTI  TADESTDTAY  IHLISLRSED  TAMYYCATET  ALVVSTTYLP  HYFDNWGQGT   120

LVTVSSASTK  GPSVFPLAPS  SKSTSGGTAA  LGCLVKDYFP  EPVTVSWNSG  ALTSGVHTFP   180

AVLQSSGLYS  LSSVVTVPSS  SLGTQTYICN  VNHKPSNTKV  DKKVEPKSCD  K            231
```

Preferably, the sequence pursuant to SEQ ID No: 1 has at most 99%, 98%, 97%, 96, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 65%, 60%, or 50% sequence identity to the sequence LVVSTTYLPHYFD (SEQ ID No: 3).

The term "at most 99% amino acid identity" as used herein means that the amino acid sequence in question has an amino acid sequence characterized in that, within a stretch of 100 amino acids, at most 99 amino acid residues are identical to the sequence to be compared to.

Sequence identity according to the present invention can, e.g., be determined by methods of sequence alignment in form of sequence comparison. Methods of sequence alignment are well known in the art and include various programs and alignment algorithms. Moreover, the NCBI Basic Local Alignment Search Tool (BLAST) is available from several sources, including the National Center for Biotechnology Information (NCBI, Bethesda, MD) and on the internet, for use in connection with the sequence analysis programs blastp, blastn, blastx, tblastn and tblastx. Percentage of identity of mutants according to the present invention relative to the amino acid sequence of e.g. SEQ ID NO: 3 or SEQ ID NO: 5 is typically characterized using the NCBI Blast blastp with standard settings. Alternatively, sequence identity may be determined using the software GENEious with standard settings. Alignment results can be, e.g., derived from the Software Geneious (version R8), using the global alignment protocol with free end gaps as alignment type, and Blosum62 as a cost matrix.

The peptide pursuant to SEQ ID No: 1 optionally comprises 1 or 2 further amino acids at the N-terminus and/or C-terminus of the peptide which are heterologous to the sequence of SEQ ID No: 17 at the corresponding position.

These 1 or 2 further amino acids may be useful as linker amino acids, e.g. for linking the peptides to a solid support, e.g. for in vitro diagnostic purposes, or for providing nucleic acid scaffolds of the invention described below.

In another embodiment, the invention relates to a peptide with a length of 25 amino acids of less comprising the sequence $$X_1 - X_2 - X_3 - X_4 - X_5 - X_6 - X_7 - X_8 - X_9 - X_{10} - X_{11} - X_{12} - X_{13} - X_{14}$$ (SEQ ID No: 2)

wherein
$X_1$ is Leu, Val or Ile, or a non-natural or natural analogue thereof,
$X_2$ is Val, or a non-natural or natural analogue thereof,
$X_3$ is Val, or a non-natural or natural analogue thereof,
$X_4$ is a natural or non-natural amino acid,
$X_5$ is a natural or non-natural amino acid,
$X_6$ is a natural or non-natural amino acid,
$X_7$ is Tyr, or a non-natural or natural analogue thereof,
$X_8$ is Leu, Val, or Ile, or a non-natural or natural analogue thereof,
$X_9$ is Pro, or a non-natural or natural analogue thereof,
$X_{10}$ is a natural or non-natural amino acid,
$X_{11}$ is a natural or non-natural amino acid,
$X_{12}$ is a natural or non-natural amino acid,
$X_{13}$ is Asp or Glu, or a non-natural or natural analogue thereof,
$X_{14}$ is a natural or non-natural amino acid,
and wherein at least one amino acid in the sequence pursuant to SEQ ID No: 2 is different from the amino acid in the sequence LVVSTTYLPHYFDN (SEQ ID No: 5) at the corresponding position,
or a peptidomimetic or retro-inverso peptide thereof.

Such peptide or immunogenic peptidomimetic or retro-inverso thereof comprising the sequence of SEQ ID No: 2 may have a length of 25 amino acids or less, preferably 20 amino acids or less, more preferably 15 amino acids or less and most preferably 14 amino acids or less. For example, the length of the peptide may be 25, 24, 23, 22, 21, 20, 19, 18, 17, 16, 15, or 14 amino acids. Preferably, the peptide or immunogenic peptidomimetic or retro-inverso thereof comprising the sequence of SEQ ID No: 1 has a length of between 15 and 25, 15 and 20, 15 and 19, 15 and 18, 15 and 17, 14 and 25, 14 and 20, 14 and 19, or 14 to 16 amino acids.

The term "wherein at least one amino acid in the sequence pursuant to SEQ ID No: 2 is different from the amino acid in the sequence LVVSTTYLPHYFD (SEQ ID No: 5) at the corresponding position" may be understood in the broadest sense that the sequence pursuant to SEQ ID No: 2 has at least on one of its positions $X_1$ to $X_{14}$ and amino acid, that is not the same amino acid as the amino acid at the corresponding position in the sequence LVVSTTYLPHYFDN (SEQ ID No: 5). Both amino acids may not be the same, if their amino acid residues differ in any kind of feature, such as different functional groups, different molecular structure, different arrangement of functional groups, different chemical bonding, etc. In particular, the differing amino acid may, independently, be a deletion, substitution or insertion. In a preferred embodiment, the differing amino acid is a substitution, such as, independently, a substitution by a different natural or non-natural amino acid, or natural or non-natural analogue of the amino acid.

The same or corresponding embodiments as for the above described peptides of the invention apply.

If only one amino acid of SEQ ID No: 2 is different from its corresponding position of the sequence of SEQ ID No. 5, it may be an amino acid at any position selected from $X_1$ to $X_{14}$. In this case, preferably, the one amino acid of SEQ ID No: 2, which differs from the corresponding position of the sequence of SEQ ID No. 5, may be at any position selected from $X_1$, $X_2$, $X_3$, $X_6$, $X_7$, $X_8$, $X_9$, $X_{11}$, $X_{12}$, $X_{13}$ and $X_{14}$, more preferably at any position selected from $X_1$, $X_2$, $X_3$, $X_7$, $X_8$, $X_9$, $X_{12}$, $X_{13}$ and $X_{14}$, yet more preferably at any position selected from $X_1$, $X_2$, $X_3$, $X_7$, $X_8$, $X_9$ and $X_{13}$ and most preferably at any position selected from $X_1$, $X_3$, $X_7$, and $X_{13}$.

If two or more amino acids of SEQ ID No: 2 differ from their corresponding positions of the sequence of SEQ ID No. 5, these may be at any combination of the positions selected from $X_1$ to $X_{14}$. Preferably, the two or more amino acids of SEQ ID No: 2, which differ from the corresponding positions of the sequence of SEQ ID No. 5 may be at any combination of the positions selected from $X_1$, $X_2$, $X_3$, $X_6$, $X_7$, $X_8$, $X_9$, $X_{11}$, $X_{12}$, $X_{13}$ and $X_{14}$, more preferably at any combination of the positions selected from $X_1$, $X_2$, $X_3$, $X_7$, $X_8$, $X_9$, $X_{12}$, $X_{13}$ and $X_{14}$, yet more preferably at any combination of the positions selected from $X_1$, $X_2$, $X_3$, $X_7$, $X_8$, $X_9$ and $X_{13}$ and most preferably at any combination of the positions selected from $X_1$, $X_3$, $X_7$, and $X_{13}$.

In general, at least 1, 2, 3, 4, 5, 6, 7, 8, 9, 10, 11, 12, 13 or 14 amino acid(s) of SEQ ID No: 2 may differ from the corresponding position of the sequence of SEQ ID No. 5. Preferably, at least 1 to 10, more preferably 1 to 8, yet more preferably 1 to 7 and most preferably 1 to 4 amino acids of SEQ ID No: 2 may differ from the corresponding position of the sequence of SEQ ID No. 5.

However, it is understood that one or more amino acids in the peptide with the sequence of SEQ ID No: 2 may be identical to the corresponding position of the sequence of SEQ ID No. 5. For example, at least 1, 2, 3, 4, 5, 6, 7, 8, 9, 10, 11, 12 or 13 amino acid(s) of SEQ ID No: 2 may be identical to the corresponding position of the sequence of SEQ ID No. 5. Preferably, at most 1 to 10, more preferably 1 to 8, yet more preferably 1 to 7 and most preferably 1 to 4 amino acids of SEQ ID No: 2 are identical to the corresponding position of the sequence of SEQ ID No. 5.

Preferably, the amino acids N-terminal and/or C-terminal to the sequence pursuant to SEQ ID No: 2 i) correspond to the sequence of SEQ ID No: 17, or ii) correspond to a sequence heterologous thereto.

Preferably, the sequence pursuant to SEQ ID No: 2 has at most 99%, 98%, 97%, 96, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 65%, 60%, or 50% sequence identity to the sequence LVVSTTYLPHYFD (SEQ ID No: 5).

The peptide pursuant to SEQ ID No: 2 optionally comprises 1 or 2 further amino acids at the N-terminus and/or C-terminus of the peptide which are heterologous to the sequence of SEQ ID No: 17 at the corresponding position.

Preferably the invention relates to a peptide according to the present invention, wherein, independently:
$X_1$ is Leu, Val, Ile, Chg or 2-Abu,
$X_2$ is Val, Chg, Cpa or Nle,
$X_3$ is Val, Chg, Cpa or Nle,
$X_4$ is Ser,
$X_5$ is Thr,
$X_6$ is Thr,
$X_7$ is Tyr, Tyr3-I or Tyr3,5-I2,
$X_8$ is Leu, Val, Ile, Chg or 2-Abu,
$X_9$ is Pro,
$X_{10}$ is His,
$X_{11}$ is Tyr, $X_{12}$ is Phe,
$X_{13}$ is Asp, Glu or Aad, or
$X_{14}$ is Asn,
or a peptidomimetic or retro-inverso peptide thereof.

In a preferred embodiment, the invention relates to a peptide of the invention, which has a length of 20 amino acids or less,
or a peptidomimetic or retro-inverso peptide thereof.

More preferably, the peptide of the invention has a length of 19 amino acids or less, yet more preferably 17 amino acids or less, still more preferably 15 amino acids or less and most preferred 14 amino acids or less.

In another preferred embodiment, the invention relates to a peptide of the invention, wherein 2 or more amino acids in the sequence pursuant to SEQ ID No: 1 are different from the amino acid in the sequence LVVSTTYLPHYFD (SEQ ID No: 3) at the corresponding position, or wherein 2 or more amino acids in the sequence pursuant to SEQ ID No: 2 are different from the amino acid in the sequence LVVSTTYLPHYFD (SEQ ID No: 5) at the corresponding position, or a peptidomimetic or retro-inverso peptide thereof.

In a further preferred embodiment, the invention relates to a peptide of the invention, wherein at least one amino acid in the sequence of SEQ ID No: 1 or 2 is replaced by a non-natural or natural analogue thereof in the peptide, or a peptidomimetic or retro-inverso peptide thereof.

In general, at least one amino acid in the sequence of SEQ ID No: 1 or 2 may be replaced by a non-natural or natural analogue thereof.

In general, at least 1, 2, 3, 4, 5, 6, 7, 8, 9, 10, 11, 12 or 13 amino acid(s) of SEQ ID No: 1 may be replaced by a non-natural or natural analogue thereof. Preferably 1 to 10, more preferably 1 to 8, yet more preferably 1 to 7 and most preferably 1 to 4 amino acids of SEQ ID No: 1 may be replaced by a non-natural or natural analogue thereof.

In general, at least 1, 2, 3, 4, 5, 6, 7, 8, 9, 10, 11, 12, 13 or 14 amino acid(s) of SEQ ID No: 2 may be replaced by a non-natural or natural analogue thereof. Preferably, 1 to 10, more preferably 1 to 8, yet more preferably 1 to 7 and most preferably 1 to 4 amino acids of SEQ ID No: 2 may be replaced by a non-natural or natural analogue thereof.

In yet another preferred embodiment, the invention relates to a peptide of the invention, wherein at least one amino acid in the sequence of SEQ ID No: 1 or 2 is replaced by a non-natural or natural analogue thereof in the peptide at one or more positions selected from $X_1$, $X_2$, $X_3$, $X_7$, $X_8$, $X_9$ and $X_{13}$.

It found in the Ala-scanning experiment in the examples that $X_1$, $X_2$, $X_3$, $X_7$, $X_8$, $X_9$ and $X_{13}$ are important for antiviral activity. Accordingly, it is preferred that the amino acid at these positions are independently selected from the amino acid in SEQ ID No: 3 or 5, respectively, at the corresponding position or a natural or non-natural analogue thereof. Such peptides with one or more natural or non-natural analogues thereof exhibited excellent antiviral activity in vitro and in vivo (see, e.g. FIGS. 5 and 7).

In general, at least one amino acid in the sequence of SEQ ID No: 1 is replaced by a non-natural or natural analogue thereof in the peptide at one or more positions selected from $X_1$ to $X_{13}$. Preferably, at least one amino acid in the sequence of SEQ ID No: 1 is replaced by a non-natural or natural analogue thereof in the peptide at one or more positions selected from $X_1$, $X_2$, $X_3$, $X_6$, $X_7$, $X_8$, $X_9$, $X_{11}$, $X_{12}$ and $X_{13}$, more preferably at one or more positions selected from $X_1$, $X_2$, $X_3$, $X_7$, $X_8$, $X_9$, $X_{12}$ and $X_{13}$, yet more preferably at one or more positions selected from $X_1$, $X_2$, $X_3$, $X_7$, $X_8$, $X_9$ and $X_{13}$ and most preferably at one or more positions selected from $X_1$, $X_3$, $X_7$, and $X_{13}$.

Also preferably, at least one amino acid in the sequence of SEQ ID No: 1 is replaced by a non-natural or natural analogue thereof in the peptide at one or more positions selected from $X_4$, $X_5$, $X_6$, $X_{10}$, $X_{11}$ and $X_{12}$. Alternatively, at least one amino acid in the sequence of SEQ ID No: 1 is replaced by a non-natural or natural amino acid which is not an analogue thereof in the peptide at one or more positions selected from $X_4$, $X_5$, $X_6$, $X_{10}$, $X_{11}$ and $X_{12}$.

In general, at least one amino acid in the sequence of SEQ ID No: 2 is replaced by a non-natural or natural analogue thereof in the peptide at one or more positions selected from $X_1$ to $X_{14}$. Preferably, at least one amino acid in the sequence of SEQ ID No: 1 is replaced by a non-natural or natural analogue thereof in the peptide at one or more positions selected from $X_1$, $X_2$, $X_3$, $X_6$, $X_7$, $X_8$, $X_9$, $X_{11}$, $X_{12}$, $X_{13}$ and $X_{14}$, more preferably at one or more positions selected from $X_1$, $X_2$, $X_3$, $X_7$, $X_8$, $X_9$, $X_{12}$, $X_{13}$ and $X_{14}$, yet more preferably at one or more positions selected from $X_1$, $X_2$, $X_3$, $X_7$, $X_8$, $X_9$ and $X_{13}$ and most preferably at one or more positions selected from $X_1$, $X_3$, $X_7$, and $X_{13}$.

Also preferably, at least one amino acid in the sequence of SEQ ID No: 2 is replaced by a non-natural or natural analogue thereof in the peptide at one or more positions selected from $X_4$, $X_5$, $X_6$, $X_{10}$, $X_{11}$ $X_{12}$ and $X_{14}$. Alternatively, at least one amino acid in the sequence of SEQ ID No: 2 is replaced by a non-natural or natural amino acid which is not an analogue thereof in the peptide at one or more positions selected from $X_4$, $X_5$, $X_6$, $X_{10}$, $X_{11}$, $X_{12}$ and $X_{14}$.

In still another preferred embodiment, the invention relates to a peptide of the invention, or a peptidomimetic or retro-inverso peptide thereof, wherein the peptide:
comprises L-amino acids, D-amino acids, or a mixture thereof,
comprises at least one backbone-modified amino acid,
is a cyclic molecule,
comprises at least one non-peptide moiety, preferably selected from a coupling group, a PEG moiety, a detectable label, a protective group, a lipid moiety and a sugar moiety, or comprises one of more post-translational modifications, and/or
is covalently or non-covalently bound to a scaffold.

In a preferred embodiment, the peptide of the invention, or the peptidomimetic or retro-inverso peptide thereof, may further comprise L-amino acids only or D-amino acids only or a combination thereof.

The peptide of the invention, or the peptidomimetic or retro-inverso peptide thereof, according to SEQ ID NO: 1, may comprise least 1, 2, 3, 4, 5, 6, 7, 8, 9, 10, 11, 12 or 13 D-amino acid(s), whereby the remaining amino acids are L-amino acids. Preferably, the peptide of the invention, or the peptidomimetic or retro-inverso peptide thereof, according to SEQ ID NO: 1 may comprise 1 to 10, more preferably 1 to 8, yet more preferably 1 to 7 and most preferably 1 to 4 D-amino acid(s), whereby the remaining amino acids are L-amino acids.

The peptide of the invention, or the peptidomimetic or retro-inverso peptide thereof, according to SEQ ID NO: 2, may comprise least 1, 2, 3, 4, 5, 6, 7, 8, 9, 10, 11, 12, 13 or 14 D-amino acid(s), whereby the remaining amino acids are L-amino acids. Preferably, the peptide of the invention, or the peptidomimetic or retro-inverso peptide thereof, according to SEQ ID NO: 2 may comprise 1 to 10, more preferably 1 to 8, yet more preferably 1 to 7 and most preferably 1 to 4 D-amino acid(s), whereby the remaining amino acids are L-amino acids.

As used throughout the present invention, the terms "L-amino acid" and "D-amino acid" may be understood in the broadest sense as the two different enantiomers (stereoisomers) around the central carbon atom of an amino acid, whereby by convention, these are called L- and D-forms, analogous to left-handed and right-handed configurations.

In a preferred embodiment, the peptide of the invention, or the peptidomimetic or retro-inverso peptide thereof, may further comprise at least one backbone-modified amino acid.

The peptide of the invention, or the peptidomimetic or retro-inverso peptide thereof, according to SEQ ID NO: 1, may comprise least 1, 2, 3, 4, 5, 6, 7, 8, 9, 10, 11, 12 or 13 backbone-modified amino acid(s), whereby the remaining amino acid(s) are not backbone-modified. Preferably, the peptide of the invention, or the peptidomimetic or retro-inverso peptide thereof, according to SEQ ID NO: 1 may comprise 1 to 10, more preferably 1 to 8, yet more preferably 1 to 7 and most preferably 1 to 4 backbone-modified amino acid(s), whereby the remaining amino acids are not backbone-modified.

In general, the peptide of the invention, or the peptidomimetic or retro-inverso peptide thereof, according to SEQ ID NO: 2, may comprise least 1, 2, 3, 4, 5, 6, 7, 8, 9, 10, 11, 12, 13 or 14 backbone-modified amino acid(s), whereby the remaining amino acid(s) are not backbone-modified. Preferably, the peptide of the invention, or the peptidomimetic or retro-inverso peptide thereof, according to SEQ ID NO: 2 may comprise 1 to 10, more preferably 1 to 8, yet more preferably 1 to 7 and most preferably 1 to 4 backbone-modified amino acid(s), whereby the remaining amino acids are not backbone-modified.

As used throughout the present invention, the term "backbone-modified amino acid" may be understood in the broadest sense as an amino acid whose backbone is modified. As used throughout the present invention, the term "backbone" of a peptide may be understood in the broadest sense as the longest series of covalently bonded atoms that together create the continuous chain of the molecule, which in a peptide usually has the recurring sequence —NH—C$\alpha$H—(C=O)—.

Examples for these modifications are post-translational modifications, which usually are performed after protein synthesis by ribosomes after the process of transcription of DNA to RNA in the cell's nucleus. If peptides are synthesized artificially, these modifications may also be added in vitro. Modifications of the backbone may for example be covalent attachments to the backbone.

Modifications of the backbone may for example target the amide N, the C=O or the C$\alpha$ or extend the N- or C-terminus of a peptide.

Backbone modifications may be chemically conservative modifications (such as the conversion of an L- to a D-amino acid or the methylation of the amide nitrogen) and substantial alterations to the backbone (including the formation of azole heterocycles). Further backbone modifications may require the presence of a certain amino acid and involve the specific residue of this amino acid.

In another preferred embodiment, the peptide of the invention, or the peptidomimetic or retro-inverso peptide thereof, may be a cyclic molecule. As used throughout the present invention, the term "cyclic molecule" in the context of a peptide or the peptidomimetic or retro-inverso peptide thereof, may be understood in the broadest sense as a series of atoms being connected to form a ring.

Preferably, either all or a part of the amino acids of the peptide, or the peptidomimetic or retro-inverso peptide thereof, form a ring. For example, at least 2 or more amino acids of the peptide, or the peptidomimetic or retro-inverso peptide thereof, may form a ring.

For example, such a ring may be formed by covalently binding of the N-terminus of the peptide to the C-terminus of the peptide. Further, such a ring may also be formed by covalently linking amino acid side chains. Peptides can be cyclized on a solid support. A variety of cyclization reagents can be used such as HBTU/HOBt/DIEA, PyBop/DIEA, PyClock/DIEA. Head-to-tail peptides can be made on the solid support. The deprotection of the C-terminus at some suitable point allows on-resin cyclization by amide bond formation with the deprotected N-terminus. Once cyclization has taken place, the peptide can be cleaved from resin by acidolysis and purified.

Figure 8:
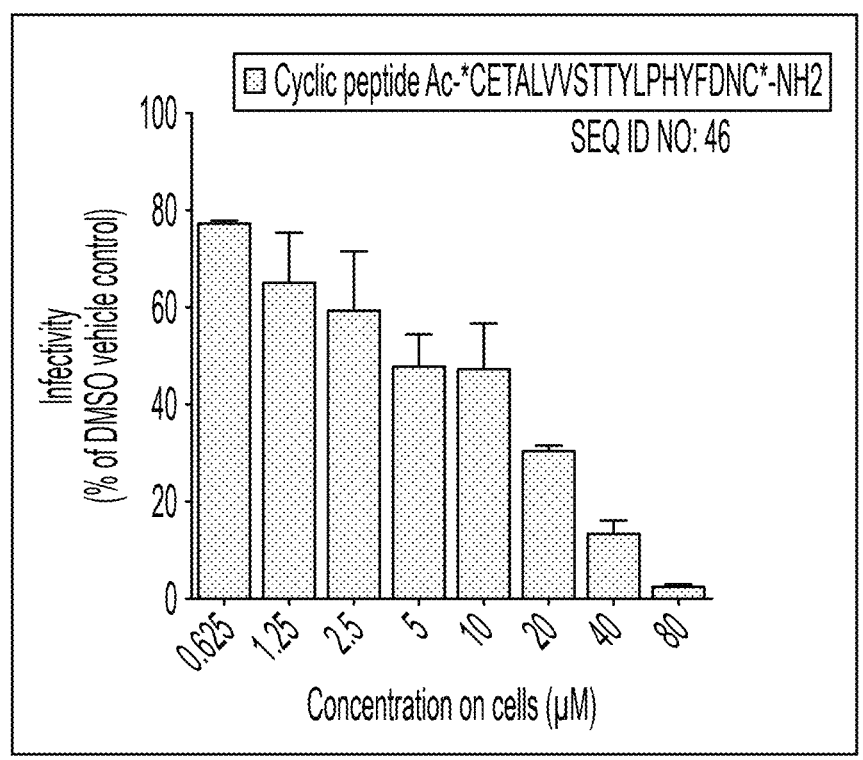

In particular, it was demonstrated in Example 6 and FIG. 8 that cyclization of the peptides of the invention does not negatively affect in vitro antiviral activity. The peptide tested in Example 6 forms a ring by covalently binding of the N-terminus of the peptide to the C-terminus of the peptide.

In another preferred embodiment, the peptide of the invention, or the peptidomimetic or retro-inverso peptide thereof, may comprises at least one non-peptide moiety, preferably selected from a coupling group, a PEG moiety, a detectable label, a protective group, a lipid moiety and a sugar moiety, or comprises one of more post-translational modifications.

As used throughout the present invention, the term "non-peptide moiety" may be understood in the broadest sense as a moiety, which is not a peptide or an amino acid. Examples of non-peptide moieties are a coupling group, a PEG moiety, a detectable label, a protective group, a lipid moiety and a sugar moiety. Suitable methods for adding a non-peptide moiety to the peptide of the invention, or the peptidomimetic or retro-inverso peptide thereof, comprise solid phase synthesis (SPPS). SPPS allows the rapid assembly of a peptide chain through successive reactions of amino acid derivatives on an insoluble porous support. The solid support consists of small, polymeric resin beads functionalized with reactive groups, such as amine or hydroxyl groups, that link to the nascent peptide chain. For example, amino acids to be coupled to the peptide chain N-terminus are used which are protected on their N-terminus and side chain using appropriate protecting groups such as Boc (acid-labile) or Fmoc (base-labile), depending on the side chain and the protection strategy used. For example, carbodiimides such as dicyclohexylcarbodiimide (DCC) and diisopropylcarbodiimide (DIC) can be used for amide bond formation. Alternatively, as an example, propanephosphonic acid anhydride, can be used as reagent for amide bond formation.

A "coupling group" is understood as a reactive chemical moiety, which allows for covalent linkage to another moiety, such as a non-peptide moiety. For example, the coupling group may be an azide group or azidolysine. For example, a peptide comprising an azide group may be covalently bound to a nucleic acid scaffold of the present invention by incubation with DBCO-coupled nucleic acid scaffold molecules, as e.g. described in Möser M. et al. (Int. J. Mol. Sci. 2018, 19, 3482; doi:10.3390/ijms19113482)

For example, a PEG moiety, which may be understood as a chain of one or more polyethylene glycol (PEG), may be added to the peptide of the invention, or the peptidomimetic or retro-inverso peptide thereof. Usually, PEG may be added to terminal carboxy or amino groups, for example at the C- or N-terminus of a peptide or at amino acid side chains.

Suitable amino acids for adding PEG are, for example, lysine, cysteine, histidine, arginine, asparagine, glutamine, serine, threonine or tyrosine. PEG may usually be attached to the peptide using standard amide bond formation, but other methods of linkage chemistry are possible as well (such as thiol-maleimide, oxime ligation or click chemistry).

Suitable detectable labels are moieties suitable for in vitro and/or in vivo detection, and are known to a skilled person. The detection may be direct, as in the case of luminescence, in particular fluorescence, or indirect in case of an enzyme or substrate thereof. Thus, both detectable labels suitable for indirect or indirect detection may be employed.

"Detectable label", "label, "label moiety" or "detectable label moiety" as used herein refers to any substance that is capable of producing a signal for direct or indirect detection. The label moiety thus may be detected directly or indirectly. For direct detection, a label moiety suitable for use in the present invention can be selected from any known detectable marker groups, like chromogens, chemiluminescent groups (e.g. acridinium esters or dioxetanes), electrochemiluminescent compounds, dyes, or fluorescent dyes (e.g. fluorescein, coumarin, rhodamine, oxazine, resorufin, cyanine and derivatives thereof), luminescent metal complexes, such as ruthenium or europium complexes and radioisotopes.

In indirect detection systems, a first partner of a bioaffine binding pair is a label moiety of the peptides of the invention; i.e. a first partner is covalently bound to a peptide of the invention. Examples of suitable binding pairs are hapten or antigen/antibody, biotin or biotin analogues such as aminobiotin, iminobiotin or desthiobiotin/avidin or streptavidin, sugar/lectin, nucleic acid or nucleic acid analogue/complementary nucleic acid, and receptor/ligand, e.g. steroid hormone receptor/steroid hormone. Preferred first binding pair members comprise hapten, antigen and hormone. Also preferred are haptens like a tag, digoxin and biotin and analogues thereof. The second partner of such binding pair, e.g. an antibody, streptavidin, etc., usually is labeled to allow for direct detection, e.g. by the label moieties as mentioned above.

Therefore, in a preferred embodiment, the label moiety is a label moiety for direct labeling, or for indirect labeling.

In one preferred embodiment, the label moiety is selected from (a) a direct labeling moiety selected from the group consisting of a chromogen, chemiluminescent group (e.g. acridinium ester or dioxetane), an electrochemiluminescent compound, a dye, a fluorescent dye (e.g. fluorescein, coumarin, rhodamine, oxazine, resorufin, cyanine and derivatives thereof), a luminescent metal complex, such as a ruthenium or europium complex, and a radioisotope; (b) or one of the partners of an indirect detection system, preferably wherein the label moiety is one of the members of the binding pairs selected from the group consisting of (i) hapten or antigen/antibody, (ii) biotin or biotin analogues such as aminobiotin, iminobiotin or desthiobiotin/avidin or streptavidin, (iii) sugar/lectin, (iv) nucleic acid or nucleic acid analogue/complementary nucleic acid, and (v) receptor or receptor fragment/ligand, e.g. steroid hormone receptor/steroid hormone.

Preferred first binding pair members as label moieties suitable for indirect detection comprise hapten, antigen and hormone. Also preferred are haptens like digoxin and biotin and analogues thereof. The second partner of such binding pair, e.g. an antibody, streptavidin, etc., is typically labeled to allow for direct detection, e.g. by the direct label moieties as mentioned above; however, it is also possible to employ an antibody covalently bound to a peptide of the invention and to use a labeled antigen or hapten for detection. In the above description of binding pair members, the term antibody is understood to encompass both antibody and antigen-binding fragments thereof.

In a preferred embodiment, the label moiety is a label moiety for direct labeling, even more preferably the label moiety is a fluorescent moiety or dye.

Suitable fluorescent moieties (or dyes) are known in the art and encompass fluorescein, Cy 3, Cy5, Cy5.5, Cy2, Cy3.5, Cy3b, Cy7, an Alexa Fluor dye, a xanthene derivative such as rhodamine, Oregon green, eosin, or Texas red, a cyanine derivative such as cyanine, indocarbocyanine, oxacarbocyanine, thiacarbocyanine, and merocyanine, a naphthalene derivative such as dansyl and prodan derivatives, a coumarin derivative, an oxadiazole derivative, such as pyridyloxazole, nitrobenzoxadiazole and benzoxadiazole, a pyrene derivatives such as cascade blue, an oxazine derivative, such as Nile red, Nile blue, cresyl violet, oxazine 170, an acridine derivatives, such as proflavin, acridine orange, acridine yellow, an arylmethine derivative, such as auramine, crystal violet, malachite green, a tetrapyrrole derivative such as porphin, phthalocyanine and bilirubin.

Suitable radioactive isotopes or radioisotopes for labeling and methods for labeling a compound of the invention with such radiolabel are known to a skilled person. For example, one of the following isotopes may be used: $^{64}Cu$, $^{14}C$, $^{3}H$, $^{32}P$, $^{33}P$, $^{123}I$, $^{125}I$, and $^{131}I$.

As an example, $^{64}Cu$-labelled peptide may be use for ImmunoPET for in vivo detection and in vivo diagnostic purposes. For example, the peptide may be modified with a PEG moiety, such as a linear 10-kDa poly(ethylene glycol) $(PEG)_{16}$ through standard succinimidyl ester-amino chemistry and a suitable chelator, such as chelator DOTA NHS (1,4,7,10-tetraazacyclododecane-1,4,7,10-tetraacetic acid mono). Further, the conjugate may be incubated with Copper (II)-64 chloride for radiolabeling, as for example described in Santangelo, P. J. et al. ("Whole-body immunoPET reveals active SIV dynamics in viremic and antiretroviral therapy-treated macaques." Nature methods vol. 12, 5 (2015): 427-32. doi:10.1038/nmeth.3320).

In case an antibody or antigen-binding fragments are used as members of the indirect system antibody/antigen or hapten, either an antibody or antigen-binding fragment specific for the epitope or hapten may be covalently bound to a peptide of the invention, or the epitope or hapten may bound to a peptide of the invention. Accordingly, the respective other member may be labeled directly, e.g. with a fluorescent label for subsequent detection.

As used throughout the present invention, the term "protective group" may be understood in the broadest sense as a chemical group introduced into a molecule by chemical modification of a functional group to obtain chemoselectivity in a subsequent chemical reaction or protect this functional group from chemical change, for example in a following reaction step. Examples for the protection of carboxylic acid groups are esters, such as methyl or benzyl esters. Amines may be protected by a 9-Fluorenylmethyl-oxycarbonyl (Fmoc) group or Tert-butyloxycarbonyl protecting group (Boc). Further examples of protective groups are well known to the person skilled in the art.

For instance a lipid moiety added to the peptide of the invention, or the peptidomimetic or retro-inverso peptide thereof, may lead to amino acid derivates, such as N-palmitoyl-cysteine (e.g. Pam3Cys, Pam2Cys), O-acyl serine, N-palmitoyl lysine, or lipoamino acids (LAAs). Lipid moieties that may be added to the peptide of the invention, or the peptidomimetic or retro-inverso peptide thereof, are well known to the person skilled in the art.

For instance, a sugar moiety added to the peptide of the invention, or the peptidomimetic or retro-inverso peptide thereof, may be a glucosyl, a mannosyl, or a 2-deoxyglucosyl group. Further sugar moieties that may be added to the peptide of the invention, or the peptidomimetic or retro-inverso peptide thereof, are well known to the person skilled in the art.

As used throughout the present invention, the term "post-translational modification" may be understood in the broadest sense as modification of the peptide of the invention, or the peptidomimetic or retro-inverso peptide thereof, following protein biosynthesis. Post-translational modifications usually occur on the amino acid side chains or at the C- or N-termini of the peptide of the invention, or the peptidomimetic or retro-inverso peptide thereof. Post-translational modifications may be added by an enzyme or non-enzymatic in vivo or in vitro. Methods for the addition of post-translational modifications are well known to the person skilled in the art.

Examples of post-translational modifications are phosphorylation, acetylation, N-linked glycosylation, amidation, hydroxylation, methylation, O-linked glycosylation, ubiquitylation, pyrrolidone carboxylic acid, sulfation, disulfide-bond formation, mono- or dioxidation, deamination, deamidation, isomerization, S-nytrosylation, palmitoylation, cyclization, gamma-carboxylation, N-myristoylation, N-acetylation, SUMOylation or methylation. Further examples of post-translational modifications are well known to the person skilled in the art.

In another preferred embodiment, the peptide of the invention, or the peptidomimetic or retro-inverso peptide thereof, may be covalently or non-covalently bound to a scaffold.

Suitable scaffolds the peptide of the invention, or the peptidomimetic or retro-inverso peptide thereof, may be bound to are mentioned below, such as for the nanostructure of the invention, or well known to the person skilled in the art.

As used throughout the present invention, the term "covalently bound to a scaffold" may be understood in the broadest sense that the peptide of the invention, or the peptidomimetic or retro-inverso peptide thereof, are connected to a scaffold by a chemical bond, which involves the sharing of electron pairs between atoms.

As used throughout the present invention, the term "non-covalently bound to a scaffold" may be understood in the broadest sense that the peptide of the invention, or the peptidomimetic or retro-inverso peptide thereof, are connected to a scaffold by electromagnetic interactions, such as hydrophobic effects.

In another preferred embodiment, the invention relates to a peptide of the invention, comprising or consisting of a sequence selected from:

VVVSTTYLPHYFDN (SEQ ID No: 6)

IVVSTTYLPHYFDN (SEQ ID No: 7)

[2-Abu]VVSTTYLPHYFDN (SEQ ID No: 8)

LV[Chg]STTYLPHYFDN (SEQ ID No: 9)

LVVSTT[Tyr3-I]LPHYFDN, (SEQ ID No: 10)

[Chg][Cpa]VSTT[Tyr3,5-I2]LPHYFDN, (SEQ ID No: 11)

[Chg][Nle][Chg]STTYLPHYFDN, (SEQ ID No: 12)

or a peptidomimetic or a retro-inverso peptide thereof.

Methods for producing the peptide of the invention, or the peptidomimetic or retro-inverso peptide thereof, are known to the person skilled in the art. In addition to chemical synthesis, such as SPPS described above, recombinant expression may be used, in particular of peptides consisting of natural, proteinogenic amino acids. For example, the peptide of the invention, or the peptidomimetic or retro-inverso peptide thereof, may be produced by recombinant expression, using adequate primers, cloning procedures and host cells.

For example, the peptide of the invention, or the peptidomimetic or retro-inverso peptide thereof, may be produced recombinantly by bacterial expression, such as by expression in *Escherichia coli*, optionally followed by subsequent purification. Recombinant expression may also be performed in a eukaryotic cell, such as a eukaryotic cell selected from an insect cell, yeast cell or mammalian cell. Such eukaryotic expression systems are well known to a skilled person.

Alternatively, the peptides of the invention may be produced by chemical synthesis by methods known in the art, such as solid-phase peptide synthesis, e.g. using the Fmoc- or Boc-strategy, as described above.

If the peptide of the invention, or the peptidomimetic or retro-inverso peptide thereof, comprises one or more non-natural amino acids, it may be produced by chemical synthesis. However, it may also be possible to prepare a part of the peptide by recombinant expression and, subsequently, modify the natural amino acids or add non-natural amino acids by chemical synthesis in vitro.

In another embodiment, the invention relates to a nanostructure comprising:
a) a nucleic acid scaffold; and
b) at least two peptide moieties, wherein the sequence of each of the at least two peptide moieties is independently selected from the sequence of a peptide of the invention described herein,
wherein the nucleic acid scaffold is selected from the group of:
i) a linear nucleic acid scaffold, wherein the at least two peptide moieties are each attached at or near different ends of the nucleic acid scaffold; and
ii) a branched nucleic acid scaffold, wherein the at least two peptide moieties are each attached to a different branch of the scaffold.

Figure 10:
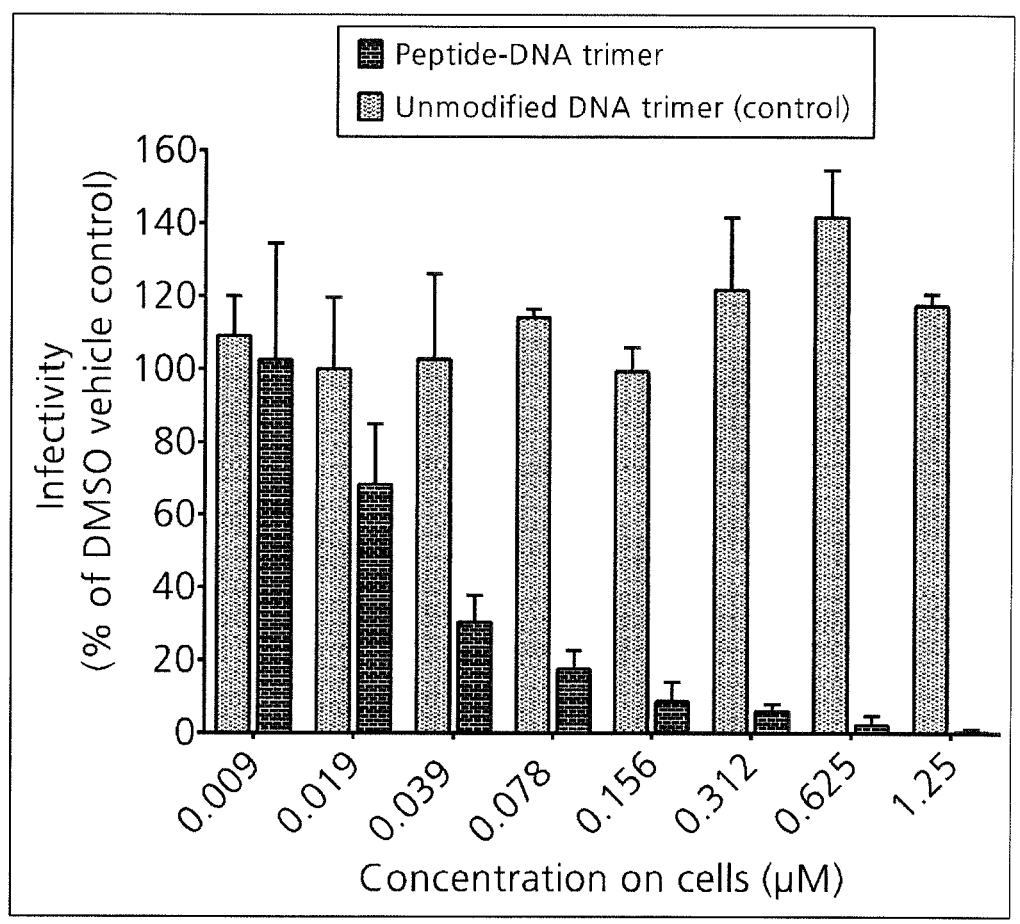

It was demonstrated in Example 8 and FIG. 10 that the nanostructures of the invention exhibit antiviral activity for RSV and are useful for the treatment, prophylactic treatment or amelioration of an RSV infection. Moreover, Example 10 and FIG. 12 indicate that attachment of the peptides to the DNA scaffold in the nanostructures of the invention may increase bioavailability of the peptides in vivo, through elimination of aggregation.

The Nucleic Acid Scaffold

The nucleic acid scaffold of the nanostructure according to the invention is preferably made of double stranded nucleic acids. Preferably, the nucleic acids of the nucleic acid scaffold are double stranded over a sufficient length to remain stable in physiological condition. A linear nucleic acid scaffold is therefore preferably made of two nucleic acids that anneal to each other under physiological conditions. Preferably, the two nucleic acids anneal to each other over a sufficient length to remain stable in physiological conditions, and more preferably over a segment length comprising at least 12 bases. It should however be understood that the linear scaffold may contain single stranded segments in its interior or on its ends as a necessary means to alter the scaffold's rigidity or add more degrees of freedom to the binding. This single stranded portion of the nucleic acids is preferably 25 or fewer nucleotides in length, more preferably 20 or fewer nucleotides, even more preferably 15 or fewer nucleotides, yet more preferably 10 or fewer nucleotides and most preferably 5 or fewer nucleotides. The skilled person is able to determine when such single stranded stretches are necessary and to design the nucleic acids as required.

Nucleic acid scaffolds as well as their synthesis and methods for producing nanostructures are known in the art and are for example described in WO 2018/215660.

When the nucleic acid scaffold is branched, each branch is preferably formed by a double stranded nucleic acid under physiological conditions over a sufficient length to remain stable in physiological conditions, and more preferably over a segment length comprising at least 12 bases. It should however be understood that the portion of the nucleic acids that form part of the branch point may still be single stranded even if the branches of a nucleic acid scaffold are double stranded. Short stretches of single stranded nucleotides may indeed be necessary to accommodate a branch point. It should also be understood that the branched scaffold may contain single stranded segments within the branches or on their ends as a necessary means to alter the branch rigidity or add more degrees of freedom to the binding. This single stranded portion of the nucleic acids at the branch point, within the branches or at the ends of the branches is preferably 25 or fewer nucleotides in length, more preferably 20 or fewer nucleotides, even more preferably 15 or fewer nucleotides, yet more preferably 10 or fewer nucleotides and most preferably 5 or fewer nucleotides. The skilled person is able to determine when such single stranded stretches are necessary and to design the nucleic acids as required.

It will also be clear to the skilled person that some mismatches between two strands can be tolerated without disrupting the annealing between the strands. Preferably, the two nucleic acids that anneal to each other to form a nucleic acid scaffold have complementary sequences over the stretch over which they are to anneal (i.e. over the entire length for a linear scaffold and from the branch point to the end of a branch for a branched scaffold) of at least 70%, more preferably 80%, yet more preferably 90%, even more preferably 95%, and most preferably 100%.

Preferably, each of the nucleic acid strands of the scaffold is made of a nucleic acid selected from the group comprising DNA and chemically stabilized variants thereof, RNA and chemically stabilized variants thereof, locked nucleic acid (LNA), peptide nucleic acid (PNA), or xeno nucleic acid (XNA; i.e. a class of nucleic acids with an unnatural moiety replacing the sugar molecule). The class of XNAs comprises for example CeNA, ANA, FANA, TNA, HNA, LNA, GNA and PNA and the binding affinities of many of them are described for example in Pinheiro, V. B., et al. (Synthetic Genetic Polymers Capable of Heredity and Evolution. (2012) Science, 336, 341-344). More preferably, each of the nucleic acid strands of the scaffold is made of a nucleic acid selected from the group comprising DNA and chemically stabilized variants thereof, RNA and chemically stabilized variants thereof, locked nucleic acid (LNA), peptide nucleic acid (PNA), and xeno-nucleic acids (XNA).

In a preferred embodiment, the nanostructure of the invention described herein is further characterized in that the nucleic acids of the nucleic acid scaffold are double stranded over a sufficient length to remain stable in physiological condition, each of the nucleic acid strands of the scaffold is made of a nucleic acid selected from the group comprising DNA and chemically stabilized variants thereof, RNA and chemically stabilized variants thereof, locked nucleic acid (LNA), peptide nucleic acid (PNA), and xeno-nucleic acids (XNA).

Suitable examples of chemically stabilized variants of DNA or RNA are known in the art and include phosphorothioate-DNA and 2'-MeO-RNA.

Preferably, each of the strands is made of a different nucleic acid. Preferably, at least one strand comprises several different types of nucleic acids. The stability of a natural nucleic acid hybrid can for example be increased by adding non-natural nucleotides such as LNA and PNA. These offer more stability both because they allow stronger binding between two strands of nucleic acids and/or because they are less likely to be degraded by enzymes. Preferably, therefore, at least one strand of the nucleic acid comprises at least 2% of a non-natural nucleotide, more preferably at least 5%, even more preferably at least 10%, yet more preferably at least 15% and most preferably at least 20%. These non-natural nucleotides can all be located next to each other in a strand or interspersed among natural nucleotides.

Preferably, however, each strand is made of one nucleic acid over its entire length. More preferably, at least two, three, four, five or most preferably all of the nucleic acid strands of the nucleic acid scaffold are made of the same nucleic acid. The nucleic acid strands of the nucleic acid scaffold are preferably made of DNA or RNA. DNA and RNA are particularly preferred nucleic acids because they are easy to manipulate, cheap to produce and extremely well studied. Their properties are therefore well understood and the nucleotide composition of such strands can be easily modulated to obtain the desired properties (length, flexibility, strength of annealing etc.) of the nucleic acid scaffold. The most preferred nucleic acid is DNA due to its high versatility and stability.

A great advantage of the nucleic acids scaffolds is that once the individual strands have been produced, the scaffold can self-assemble when the mix of nucleic acids is subjected to the appropriate hybridisation conditions. This can be performed before attaching the peptide moieties to the different strands of nucleic acids. Alternatively, the peptides can be attached to the pre-formed nucleic acid scaffold in order to obtain the nanostructures according to the invention.

Preferably, the nucleic acid scaffold is further stabilised by chemical modifications. An example of such a chemical modification is a covalent bond between two individual nucleic acid strands of the scaffold. Further chemical modifications are well known to the person skilled in the art. Such a modification provides the nucleic acid scaffold with higher stability.

Preferably, the nanostructure comprises at least one detectable label. A detectable label can be any conjugated molecule that allows the presence of a nanostructure that carries the label to be detected. Suitable detectable labels are disclosed above in the context of the peptide. The same preferred embodiments apply as for the peptides of the invention. A nanostructure that comprises a detectable label is particularly useful for use in diagnosis. The detectable label allows the user to detect whether a nanostructure is present or absent in the diagnostic assay. The nanostructure may be used both for in vitro and for in vivo diagnostic purposes. The detectable label can be bound to the nucleic acid scaffold or to a peptide of the nanostructure. The detectable label can for example also be an integral part of the peptide in the form for example of a fluorescent amino acid. The label can be bound to the nanostructure either covalently or non-covalently.

The nucleic acid scaffold of the nanostructure is preferably branched. It therefore preferably comprises more than two ends. It preferably comprises three branches. Since each branch has one end, a nucleic acid scaffold with three branches also comprises three ends. The nanostructure according to the invention is however not limited to a nucleic acid scaffold with three branches. The nucleic acid scaffold may indeed have four, five, six seven, eight, nine or even ten or more branches. Each of these branches may potentially carry at least one peptide moiety that may bind to a molecule expressed on the surface of an RSV under physiological conditions. Preferably, each of the branches of the nucleic acid scaffold is attached to at least one of such a peptide moiety. The optimal number of branches of the nucleic acid scaffold depends on the application for which the nanostructure is to be used.

Preferably, at least one peptide moiety is attached to essentially each branch of the nucleic acid scaffold.

In the context of this invention, the word "essentially" is to be understood as at least 80%, preferably 85%, more preferably 90%, even more preferably 95%, yet more preferably 98%, and most preferably 100%.

Preferably, each of the branches of the nucleic acid scaffold emanates from the same branch point (from a single junction). In an alternative, preferably, the nucleic acid scaffold comprises more than one branch point and the different branches of the scaffold do not all emanate from the same branch point. This is only possible for nanostructures with more than three branches. When the nanostructure comprises more than three branches, it therefore may comprise one, two, three, four, five, six or more branch points. The number of possible branch points depends on the number of branches of the nanostructure. The possibility of having more than one branch point in the nucleic acid scaffold provides more flexibility in the shape and design of the nanostructures. It indeed allows one to modulate the geometry of the nanostructure and to position the peptide moieties in exactly the required position relative to each other.

A nanostructure with a branched nucleic acid scaffold preferably comprises as many individual nucleic acids as there are branches in the scaffold. This can be expressed as follows: a branched nucleic acid scaffold with n branches preferably comprises n strands of nucleic acids hybridised in such a way as to form the nucleic acid scaffold, wherein n>3. Each of the individual nucleic acids in such a case is able to hybridise to another nucleic acid of the scaffold essentially from its end to a branch point, and to at least another of the nucleic acids of the scaffold from essentially the branch point to essentially its other end. In the case when the nucleic acid scaffold comprises more than one branch point, the individual nucleic acids that span more than one branch point are hybridised to more than two of the other nucleic acids of the nucleic acid scaffold.

In an alternative, preferably, the nucleic acid scaffold consists of a single nucleic acid. Preferably, at least some of the ends of the nanostructure are in fact a loop to which at least one peptide moiety can be attached. One advantage of a nanostructure with only one nucleic acid strand is that it is even easier and therefore likely cheaper and quicker to produce than a nanostructure that comprises several strands of nucleic acid. Another advantage is that a nucleic acid with fewer ends is more resistant to degradation because most nucleases are exonucleases that degrade nucleic acids from their ends or from breaks in a double strand. Nucleic acids that comprise only one end can for example be produced by using a ligase to ligate together two ends that are in close proximity in a structure. Alternatively, they can be produced by using a single nucleic acid for each nanostructure.

Preferably, each branch has a maximum length, as defined by the distance between the closest branch point to the end of the branch, of 200 nm, preferably 100 nm, more preferably 50 nm, even more preferably 25 nm, yet more preferably 10 nm and most preferably 5 nm. The length of each branch of the nanostructure can also be expressed in length ranges. Preferably, therefore, each branch of the nanostructure has a length of between 2 nm and 200 nm, more preferably between 3 nm and 100 nm, even more preferably between 3.5 nm and 50 nm, yet more preferably between 4 nm and 25 nm, most preferably between 4.5 nm and 10 nm and yet most preferably 5 nm. Further, the length of a branch of the nucleic acid scaffold can be expressed in the number of nucleotides belonging to it. Preferably, the branch of the nucleic acid scaffold is about 5 to 50, more preferably about 10 to 35 and most preferably about 10 to 25 nucleotides in length.

Preferably, the length of each of the branches of the nucleic acid scaffold is selected so as to provide the nanostructure with the optimal binding geometry to bind its target. Also preferably, different branches of the nucleic acid scaffold are of different lengths. However, further preferably, all of the branches of the nucleic acid scaffold are of the same length.

Moreover, preferably, the nucleic acid sequences of the nucleic acid scaffold are selected so as to provide rigid arms and flexible branch points.

The terms "branches" and "arms" are used interchangeably in the context of nanostructures the present invention.

Rigid branches or arms can be obtained by providing double-stranded branches of a certain length. The rigidity of a double stranded nucleic acid nucleic acid is defined by the material term "persistence length". If a double-stranded segment is much shorter than the persistence length, then it is effectively rigid. If it is much longer, then it is effectively flexible. For double-stranded DNA, the persistence length is 50 nm. The skilled person will be able to measure or calculate the persistence length of any other nucleic acid used in the nanostructure. Preferably, therefore, each of the branches has a length of 50% or less of its persistence length, preferably 40% or less, more preferably 35% or less, even more preferably 30% or less, yet more preferably 25% or less and most preferably 20% or less.

The Peptide Moieties

Preferably, the at least two peptide moieties attached to the nucleic acid scaffold each bind to a molecule expressed on the surface of respiratory syncytial virus. Preferably, the at least two peptide moieties attached to the nucleic acid scaffold each bind to a molecule expressed on the surface of respiratory syncytial virus with an equilibrium dissociation constant (KD) of less than 500 µM under physiological conditions. Preferably, this KD is of less than 200 µM, more preferably less than 100 µM, even more preferably less than 50 µM, yet more preferably less than 40 µM, yet more preferably less than 30 µM, and most preferably less than 25 µM.

Preferably, the peptide moieties each bind to RSV Fusion (F) glycoprotein. Preferably, the peptide moieties each bind to RSV Fusion (F) glycoprotein with a KD 30 µM or less, preferably 20 µM or less, more preferably 15 µM or less, even more preferably 10 µM or less, yet more preferably 5 µM or less and most preferably 1 µM or less under physiological conditions.

In a preferred embodiment, the peptide moieties each bind to RSV Fusion (F) glycoprotein with a KD 10 µM or less under physiological conditions, Methods for determining the equilibrium dissociation constant KD are well known in the art (see for example Memczak, H. et al. Anti-Hemagglutinin Antibody Derived Lead Peptides for Inhibitors of Influenza Virus Binding. (2016) PLoS One 11). For example, surface plasmon resonance measurement can be used.

"Physiological conditions" in the context of this document are broadly to be understood as conditions in which normal peptides, proteins and nucleic acids are present in their native form, i.e. they are not denatured. The skilled person is able to determine for each peptide, nanostructure and for the respiratory syncytial virus of the invention what these conditions are. Physiological conditions are generally mild conditions that can be found inside living organisms or are compatible with living organisms. Broadly, physiological conditions usually are conditions in which the pH is mild (between 5 and 9, but preferably between 6 and 8), the salt concentration is around 8 grams per liter, and the temperature does not exceed 60° C., but preferably, it does not exceed 50° C. or even more preferably, 40° C.

Preferably, each of the peptide moieties is a peptide of 13 to 25 amino acids, more preferably of 14 to 22 amino acids, even more preferably of 16 to 20 amino acids and most preferably of 18 to 19 amino acids. In any case, the preferred individual peptide moieties are of less than 25, preferably less than 22, more preferably less than 20, and most preferably less than 15 amino acids. For example, each of the peptide moieties is a peptide of 13, 14, 15, 16, 17, 18, 19, 20, 21, 22, 23, 24 or 25 amino acids.

One of the advantages of the present nanostructure is that the peptide components of the structure are usually small compared for example to antibodies. Each heavy and light chain of a typical antibody comprises over 400 and over 200 amino acids, respectively. The peptide moieties of the nanostructures of the present invention are therefore in general small in comparison. Indeed, a typical 3-branded structure with 15 nucleotides per branch and one peptide on each branch is approximately 35 kDa. This usually represents only about one fifth of the size of a typical antibody. In addition to the higher design flexibility this small size offers, nanostructures of the present invention can be produced at a fraction of the cost of antibodies. Producing the two components of the nanostructures, i.e. the nucleic acid strands, especially DNA, and short peptides, is relatively straightforward and cheap. The peptide moieties can indeed preferably be produced by solid-phase peptide synthesis, preferably using the Fmoc- or Boc-strategy. Similarly, DNA strands can be produced in high quality and quantity by solid-phase synthesis. In contrast, antibodies are produced and recovered from animals or cell cultures. This is expensive and such production methods lead to potentially large variations between different batches. In contrast, the production of the nanostructures is much less subject to variation because biological matter is not involved and every production parameter can therefore be much more tightly controlled.

Preferably, the at least two peptide moieties of the nanostructure each bind to different molecules expressed on the surface of RSV. Preferably, when a nanostructure carries more than two peptide moieties, each of the peptide moieties binds to a different molecule expressed on the surface of RSV. Preferably, however, the at least two peptide moieties of the nanostructure bind to the same molecule (e.g. an oligomeric protein) expressed on the surface of RSV. Further, preferably, all of the peptide moieties of the nanostructure bind to the same molecule expressed on the surface of RSV. Moreover, preferably, all of the peptide moieties of a given nanostructure are the same.

The advantage of having two or more peptide moieties that bind to the same molecule on a nanostructure is that the nanostructure may benefit from the cooperative binding effect of the two or more moieties. This allows stronger binding between the nanostructure and the virus, provided the distance between the different peptide moieties allows such binding. The more peptide moieties are attached to the nucleotide scaffold, the higher the potential binding affinity of the nanostructure to the virus, and therefore the higher the potential effect of the nanostructure in the treatment of the infection and the better the potential sensitivity of a method of detection of the virus using the nanostructure. A further advantage of the nanostructures of the invention over antibodies is therefore that they may allow cooperative binding to more than two target molecules.

The mechanism that leads to inhibition of the viruses is the binding of several peptides that are connected through the nanostructures according to the invention. This results in blocked viral receptors that hinders the viruses from binding to or entering cells.

Examples for appropriate RS Virus-binding peptides according to the invention are the peptides comprising or consisting of a sequence of any of SEQ ID NOs: 1, 2, 4 and 6 to 12, or a peptidomimetic or retro-inverso peptide thereof. Other examples can include peptides derived by phage display screening against whole respiratory syncytial virus particles or specific proteins appearing on the surface of respiratory syncytial virus, e.g., such as respiratory syncytial virus Fusion (F) glycoprotein, in silico modelling of peptides binding to proteins on the surface of respiratory syncytial virus, or proteins derived from the sequences of the active CDR regions of antibodies that are responsible for the binding interaction with proteins on the surface of viruses.

In a preferred embodiment, the peptide moieties comprise or consist of a sequence of any of SEQ ID NOs: 1, 2, 4 and 6 to 12, or a peptidomimetic or retro-inverso peptide thereof.

The peptide moieties attached to the nucleic acid scaffold may be the same or may be different. Further, preferably, all peptide moieties attached to the nucleic acid scaffold may be the same.

Preferably, the nucleic acid scaffold is branched and comprises at least three peptide moieties. Further, preferably, the nucleic acid scaffold is branched and at least three peptide moieties are each attached to a branch of the nucleic acid scaffold. Moreover, preferably, the nucleic acid scaffold is branched and at least three peptide moieties are each attached to a different branch of the nucleic acid scaffold.

In a preferred embodiment, the nucleic acid scaffold is branched and at least three peptide moieties are each attached to a different branch of the nucleic acid scaffold, preferably wherein all the branches of the scaffold emanate from a single junction.

In another preferred embodiment, the nucleic acid scaffold is branched and at least three peptide moieties are each attached to a different branch of the nucleic acid scaffold, wherein all the branches of the scaffold emanate from a single junction, and wherein each branch of the nucleic acid scaffold is about 10 to 25 nucleotides in length.

In a further preferred embodiment, the nucleic acid scaffold is branched and three peptide moieties are each attached to a different branch of the nucleic acid scaffold via the N-terminus of the peptide moieties, the C-terminus of the peptide moieties, or via an amino acid side chain.

Design Process for the DNA Structure

The DNA structure can be designed by a method as described in WO 2018/215660 or by any method known to the person skilled in the art.

In a further preferred embodiment, the nanostructure of the present invention is further characterized in that
- the nucleic acids of the nucleic acid scaffold are double stranded over a sufficient length to remain stable in physiological condition, each of the nucleic acid strands of the scaffold is made of a nucleic acid selected from the group comprising DNA and chemically stabilized variants thereof, RNA and chemically stabilized variants thereof, locked nucleic acid (LNA), peptide nucleic acid (PNA), and xeno-nucleic acids (XNA),
- the peptide moieties each bind to RSV Fusion (F) glycoprotein with a KD 10 µM or less under physiological conditions,
- the peptide moieties comprise or consist of a sequence of any of SEQ ID NOs: 1 to 16, or a retro-inverso peptide thereof,
- the nucleic acid scaffold is branched and at least three peptide moieties are each attached to a different branch of the nucleic acid scaffold, preferably wherein all the branches of the scaffold emanate from a single junction,
- the nucleic acid scaffold is branched and at least three peptide moieties are each attached to a different branch of the nucleic acid scaffold, wherein all the branches of the scaffold emanate from a single junction, and wherein each branch of the nucleic acid scaffold is about 10 to 25 nucleotides in length, and/or
- the nucleic acid scaffold is branched and three peptide moieties are each attached to a different branch of the nucleic acid scaffold via the N-terminus of the peptide moieties, the C-terminus of the peptide moieties, or via an amino acid side chain, wherein the nanostructure optionally further comprises a detectable label.

In another embodiment, the invention relates to a pharmaceutical composition comprising a peptide of the invention described herein, or a nanostructure of the invention described herein, and optionally one or more pharmaceutically acceptable adjuvants and/or excipients.

The term "pharmaceutically acceptable adjuvants" in its broadest sense is understood to comprise drugs that have few or no pharmacological effects by themselves, but may increase the efficacy or potency of other drugs when given at the same time.

Suitable excipients are e.g. water, protease inhibitors, peptidase inhibitors, nuclease inhibitors, or any enzyme capable of cleaving a peptide or nanostructure of the invention, as well as buffering compounds, such as phosphate, Tris or HEPES. The pharmaceutical composition may further comprise stabilizers, in particular wherein the composition is an aqueous liquid, such as an aqueous solution.

Further suitable pharmaceutically acceptable adjuvants, excipients and stabilizers are well known to the person skilled in the art.

The pharmaceutical composition may further comprise additional viral inhibitors targeting the same or different proteins of RSV, further active agents for the treatment of respiratory tract infections and/or general antivirals. Suitable additional active agents are e.g. antibodies, such as palivizumab. The pharmaceutical composition may further comprise additional active agents for the (prophylactic) treatment of bronchiolitis, pneumonia, asthma, and/or acute otitis media, such as nebulized hypertonic saline or salbutamol. Suitable active agents or general antivirals are well known to the person skilled in the art.

In another embodiment, the invention relates to a nucleic acid comprising a sequence encoding a peptide of the invention described herein, in particular for peptides consisting of natural, proteinogenic amino acids.

In yet another embodiment, the invention relates to a peptide of the invention described herein, or a nanostructure of the invention described herein, or a pharmaceutical composition of the invention described herein, or a nucleic acid of the invention described herein, for use as a medicament.

In the meaning of the invention, "use as a medicament" may be understood in the broadest sense as use of a peptide of the invention described herein, or a nanostructure of the invention described herein, or a pharmaceutical composition of the invention described herein, or a nucleic acid of the invention described herein for the treatment of a disease or a condition, but also as prophylactic treatment or for amelioration. The use preferably is the treatment of a respiratory tract infection. Preferably, the nanostructures of the invention are for use in the treatment of a Respiratory Syncytial Virus (RSV) infection.

In another embodiment, the invention relates to a peptide of the invention described herein, or a nanostructure of the invention described herein, or a pharmaceutical composition of the invention described herein, or a nucleic acid of the invention described herein, for use in the treatment, prophylactic treatment, or amelioration of a Respiratory Syncytial Virus (RSV) infection.

Figure 11:
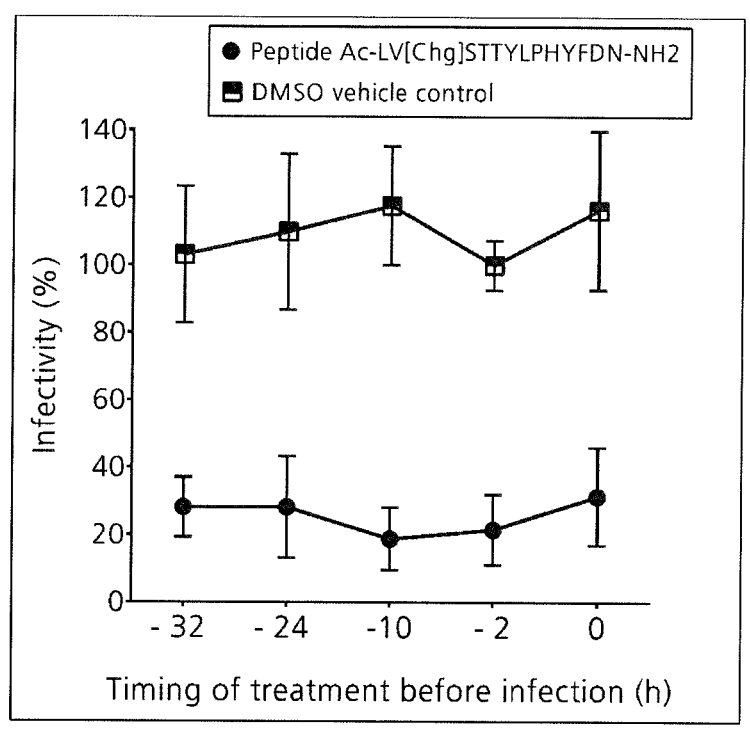

In particular, the data in Example 9 and FIG. 11 demonstrate that the peptides of the invention are stable for long periods of time in biological conditions. The peptides are therefore particularly useful for in vivo applications in the human and mammal body, for therapeutic and prophylactic purposes.

Example 9 and FIG. 11 demonstrate that the peptides of the invention are in particular useful for the prophylactic treatment of an RSV infection.

Figure 9:
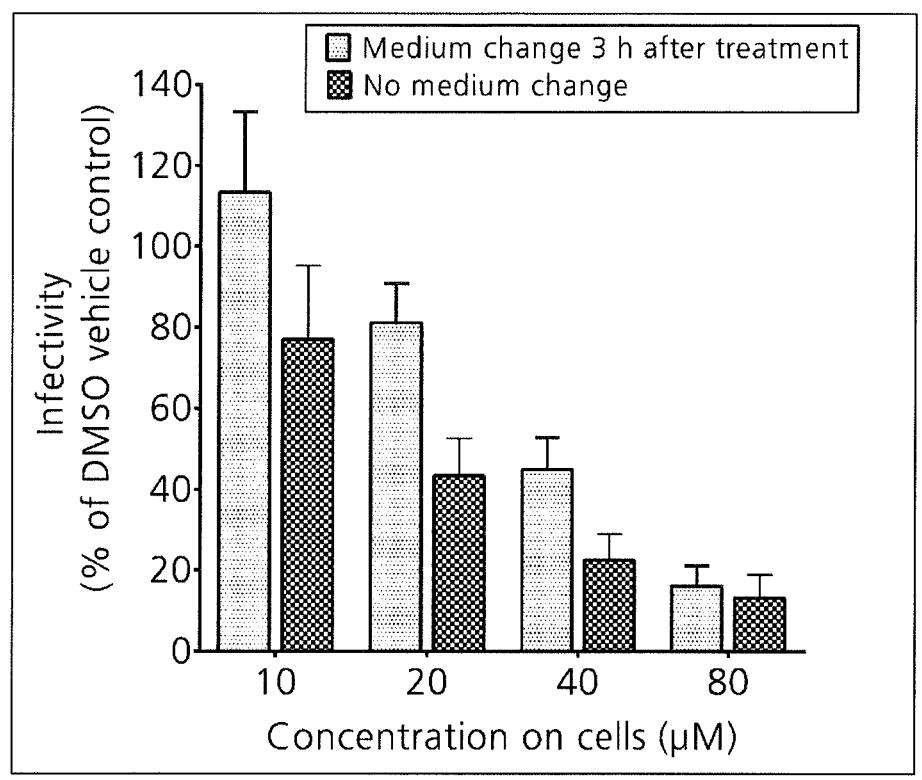

Moreover, the data in Example 7 and FIG. 9 on pre-treatment of cells with a peptide of the invention prior to RSV application demonstrate that the peptides of the invention are useful for the prophylactic treatment of an RSV infection.

In yet another embodiment, the present invention relates to a method of treating, prophylactically treating or ameliorating an Respiratory Syncytial Virus (RSV) infection in a subject in need thereof, comprising administering to said patient a therapeutically effective amount of a peptide of the invention described herein, or a nanostructure of the invention described herein, or a pharmaceutical composition of the invention described herein, or a nucleic acid of the invention described herein.

In particular, the peptides and nanostructures of the present invention are useful for inhibiting RSV entry into mammalian cells. In one preferred embodiment, the peptides and nanostructures of the present invention are useful for inhibiting RSV entry into mammalian cells in vitro. In one preferred embodiment, the peptides and nanostructures of the present invention are useful for inhibiting RSV entry into mammalian cells in vivo.

Further the peptides and nanostructures of the present invention are useful for inhibiting RSV spreading. In one preferred embodiment, the peptides and nanostructures of the present invention are useful for inhibiting RSV spreading in mammalian cells in vitro. In one preferred embodiment, the peptides and nanostructures of the present invention are useful for inhibiting RSV spreading in mammals in vivo.

Therefore, in one preferred embodiment, the treatment, prophylactic treatment, or amelioration of a Respiratory Syncytial Virus (RSV) infection is by inhibiting RSV entry into mammalian cells and/or by inhibiting RSV spreading in mammals in vivo.

The term "Treatment" may be understood in the broadest sense that the subject treated with the peptide of the invention described herein, or the nanostructure of the invention described herein, or the pharmaceutical composition of the invention described herein, or the nucleic acid of the invention described herein, has already been infected with Respiratory Syncytial Virus. The treatment may be performed at any stage of the infection, e.g. during incubation time or when symptoms of Respiratory Syncytial Virus (RSV) infection are visible or the disease is ongoing or when the infection is nearly defeated or has become chronic.

The term "Prophylactic treatment" may be understood in the broadest sense that the subject treated with the peptide of the invention described herein, or the nanostructure of the invention described herein, or the pharmaceutical composition of the invention described herein, or the nucleic acid of the invention described herein is not infected with Respiratory Syncytial Virus. The intention of the prophylactic treatment may be to prevent an infection.

The term "Amelioration" may be understood in the broadest sense as any improvement of the condition of an infected subject, e.g. a reduction of symptoms or a reduction of the viral load of RSV in the treated subject.

The subject may be any mammal, including humans. Preferably, the subject is a human.

The peptide of the invention described herein, or the nanostructure of the invention described herein, or the pharmaceutical composition of the invention described herein, or the nucleic acid of the invention described herein may be administered in any manner including, but not limited to, orally, parenterally, sublingually, transdermally, transmucosally, topically, via inhalation, via buccal or intranasal administration, or combinations thereof. Parenteral administration includes, but is not limited to, intravenous, intraarterial, intra-peritoneal, subcutaneous and intramuscular. In a preferred embodiment, the composition is formulated, in accordance with routine procedures, as a pharmaceutical composition adapted for intranasal, or intravenous administration to human beings.

Typically, compositions for intravenous administration are solutions in sterile isotonic aqueous buffer. Where necessary, the composition may also include a solubilizing agent and a local anesthetic such as lidocaine to ease pain at the site of the injection. Generally, the ingredients are supplied either separately or mixed together in unit dosage form, for example, as a dry lyophilized powder or water-free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water or saline for injection can be provided so that the ingredients may be mixed prior to administration.

Preferably, the peptide of the invention described herein, or the nanostructure of the invention described herein, or the pharmaceutical composition of the invention described herein, or the nucleic acid of the invention is formulated for intranasal administration. The peptides, nanostructures and pharmaceutical compositions can be formulated, for example, in liquid form as nose drops, spray, or suitable for inhalation, as powder, as cream, or as emulsion. For straightforward application, the peptide, nanostructure or pharmaceutical composition is preferably supplied in a vessel appropriate for distribution of the peptide or nanostructures in the form of nose drops or an aerosol.

In a more preferred embodiment, the peptide of the invention described herein, or the nanostructure of the invention described herein, or the pharmaceutical composition of the invention described herein, or the nucleic acid of the invention is administered by inhalation or spraying.

Preferably, the peptide of the invention described herein, or the nanostructure of the invention described herein, or the pharmaceutical composition of the invention described herein, or the nucleic acid of the invention described herein is formulated for a method of administration to the lungs of a subject, said method comprising: dispersing a dry powder composition or an inhalable formulation comprising a the peptide of the invention described herein, or the nanostructure of the invention described herein, or the pharmaceutical composition of the invention described herein, or the nucleic acid of the invention to form an aerosol; and delivering the aerosol to the lungs of the subject by inhalation of the aerosol by the subject, thereby ensuring delivery of the compound according to the invention to the lungs of the subject. Typically, the aerosol is delivered to the endobronchial space of airways from the subject.

For example, the peptide of the invention described herein, or the nanostructure of the invention described herein, or the pharmaceutical composition of the invention described herein, or the nucleic acid of the invention according to the invention described herein is delivered by a dry powder inhaler or by a metered dose inhaler.

The peptides of the invention described herein, or the nanostructures of the invention described herein, or the pharmaceutical compositions of the invention described herein, or the nucleic acids of the invention described herein of the invention can be formulated as neutral or salt forms. Pharmaceutically acceptable salts include those formed with free carboxyl groups such as those derived from hydrochloric, phosphoric, acetic, oxalic, tartaric acids, etc., those formed with free amine groups such as those derived from isopropylamine, triethylamine, 2-ethylamino ethanol, histidine, procaine, etc., and those derived from sodium, potassium, ammonium, calcium, and ferric hydroxides, etc.

The amount of the peptide of the invention described herein, or the nanostructure of the invention described herein, or the pharmaceutical composition of the invention described herein, or the nucleic acid of the invention described herein, which will be effective in the treatment of a particular disorder or condition, will depend on the nature of the disorder or condition, and can be determined by standard clinical techniques. In addition, in vitro assays may optionally be employed to help identify optimal dosage ranges. The precise dose to be employed in the formulation will also depend on the route of administration, and the seriousness of the disease or disorder, and should be decided according to the judgment of the practitioner and each patient's circumstances.

However, suitable dosage ranges for intravenous administration are generally about 20-500 micrograms of active compound per kilogram body weight. Suitable dosage ranges for intranasal administration are generally about 0.01 pg/kg body weight to 1 mg/kg body weight. Effective doses may be extrapolated from dose-response curves derived from in vitro or animal model test systems.

Throughout the invention, the term "effective amount" means that a given molecule or compound is administered in an amount sufficient to obtain a desired therapeutic effect.

In yet another embodiment, the invention relates to a use of a peptide of the invention described herein, or a nanostructure of the invention described herein, or a pharmaceutical composition of the invention described herein, or a nucleic acid of the invention described herein, as an in vitro RSV antiviral agent.

The term "In vitro" may be understood in the broadest sense that the use is performed out of the biological context, e.g. outside of the body of a subject or with a sample isolated from its biological context. An in vitro use may, for example, be performed in labware such as test tubes, flasks, Petri dishes, and microtiter plates. Other suitable in vitro uses are well known to the person skilled in the art.

The term "RSV antiviral agent" may be understood in the broadest sense that the peptide of the invention described herein, or a nanostructure of the invention described herein, or a pharmaceutical composition of the invention described herein, or a nucleic acid of the invention described herein, target RSV and/or at least one of its components, such as respiratory syncytial virus Fusion (F) glycoprotein.

In a preferred embodiment, the use as RSV antiviral agent is by inhibiting RSV entry into mammalian cells and/or by inhibiting RSV spreading in mammalian cells.

In still another embodiment, the invention relates to a use of a peptide of the invention described herein, or a nanostructure of the invention described herein, as an in vitro diagnostic agent for detecting RSV.

The term "diagnostic agent" may be understood in the broadest sense as an agent suitable for the detection of RSV and/or the differentiation of this virus from other viruses or infections. An in vitro diagnostic agent usually is applied in an in vitro environment, e.g. a sample collected from a subject, as described above. Methods for collecting samples from a subject are well known to a person skilled in the art.

The term "detecting RSV" may be understood in the broadest sense as comprising, both, the qualitative and the quantitative measurement of RSV. Qualitative measurement may be understood in the broadest sense as measuring the presence of any complete RSV and/or one of its components, such as respiratory syncytial virus Fusion (F) glycoprotein in a sample. However, the detection may also be performed as a quantitative measurement of a sample, wherein the viral load of this sample and/or the number of RSV components, such as respiratory syncytial virus Fusion (F) glycoprotein, in a sample is determined.

In a further embodiment, the invention relates to a peptide of the invention described herein, or a nanostructure of the invention described herein, for use in the diagnosis of a Respiratory Syncytial Virus (RSV) infection.

The term "diagnosis of an RSV infection" may be understood in the broadest sense as investigating, whether a Respiratory Syncytial Virus (RSV) infection causes a subject's symptoms and signs. The diagnosis of an RSV infection may be performed by detecting the presence of RSV in the body. The diagnosis may be performed in vivo or in vitro.

In vivo diagnosis may for example be performed with suitable radioisotopes. Suitable radioactive isotopes or radioisotopes for labeling and methods for labeling a compound of the invention with such radiolabel are known to a skilled person. For example, one of the following isotopes may be used: $^{64}Cu$, $^{14}C$, $^{3}H$, $^{32}P$, $^{33}P$, $^{123}I$, $^{125}I$ and $^{131}I$.

In one preferred embodiment, in vivo diagnosis may be performed using Positron-emission tomography (PET).

As an example, $^{64}Cu$-labelled peptide may be use for ImmunoPET for in vivo detection and in vivo diagnostic purposes. For example, the peptide may be modified with a PEG moiety, such as a linear 10-kDa poly(ethylene glycol) $(PEG)_{16}$ through standard succinimidyl ester-amino chemistry and a suitable chelator, such as chelator DOTA NHS (1,4,7,10-tetraazacyclododecane-1,4,7,10-tetraacetic acid mono). Further, the conjugate may be incubated with Copper (II)-64 chloride for radiolabeling, as for example described in Santangelo, P. J. et al. ("Whole-body immunoPET reveals active SIV dynamics in viremic and antiretroviral therapy-treated macaques."; Nature methods vol. 12, 5 (2015): 427-32. doi:10.1038/nmeth.3320).

Alternatively, further known in vivo imaging methods may be used, such as magnetic resonance imaging, e.g. using superparamagnetic particles or paramagnetic ions, such as $Gd^{3+}$, or The term "in vivo" may be understood in the broadest sense that the diagnosis is performed on the subject, e.g. on its body or in its biological context. The diagnosis of the RSV infection may be performed by detecting the presence of RSV in a subject using a peptide of the invention described herein, or a nanostructure of the invention described herein.

The in vitro diagnosis is performed on a sample out of the biological context as described above. Samples required for in vitro diagnosis are typically collected from the subject of interest. Methods for collecting samples are well known to the person skilled in the art. The diagnosis of the RSV infection may be performed by detecting the presence of RSV in a sample that has been taken from a subject using a peptide of the invention described herein, or a nanostructure of the invention described herein.

A diagnosis may, for example, comprise the correlation of various pieces of information followed by the recognition and differentiation of patterns.

In another embodiment, the invention relates to a method of detecting whether a Respiratory Syncytial Virus is present in a sample comprising the steps of:

a. adding to the sample an appropriate amount of a peptide of the invention described herein, or a nanostructure of the invention described herein, wherein the peptide, or peptide moieties of the nanostructure, bind(s) under physiological conditions to Fusion (F) glycoprotein expressed on the surface of the RSV virus to be detected;
b. incubating the mixture obtained in a. under physiological conditions; and
c. detecting whether the peptide or nanostructure has bound to the surface of the virus, wherein binding of the nanostructure to the virus is indicative of the presence of the virus in the sample.

The detection of the presence of the RSV may depend on the limits of detection of the used detection methods and detecting devices.

The sample in such a method can be a sample that has been taken from a subject. This method can therefore be used for the diagnosis of an infection with RSV. As the method is performed on a sample, the method is performed in vitro.

Step a.

The peptides or nanostructures of the invention may be added using common labware, such as pipettes, which are known to the person skilled in the art.

Adding an "appropriate amount" of a peptide or a nanostructure of the invention described herein to the sample in step a comprises amounts of samples that are sufficient to cause to a detectable signal when binding to Fusion (F) glycoprotein expressed on the surface of the RSV under physiological conditions. As various detection methods and detecting devices have different limits of detection, the appropriate amount may vary. The person skilled in the art usually knows suitable detection methods and detecting devices and may adapt the appropriate amount of peptide or nanostructure accordingly.

For example, peptides of the invention may be added at concentrations of 5 to 100 µM, preferably 10 to 80 µM, more preferably 15 to 60 µM and most preferably 20 to 40 µM.

The term "Physiological conditions" in the context of this invention and used in this method is described above. Concerning this embodiment, the physiological conditions may not only depend on the environmental conditions required for the virus and the peptide or the nanostructure, but also especially depend on the investigated sample.

Step b.

Incubation conditions are corresponding to the physiological conditions described for step a. Preferably, the incubation time is from 1 h to 7 days, preferably from 24 h to 5 days, yet more preferably from 40 h to 72 h, most preferably about 48 h.

Step c.

The detection of whether nanostructures have bound to the surface of a virus may further be carried out, for example, by detecting the nucleic acid of the nanostructure on the surface of the virus by microscale thermophoresis (MST) or some other appropriate means.

Other assays that can be used are a label free detection assays such as surface plasmon resonance (SP) or quartz crystal microbalance (QCM); surface acoustic wave (SAW), where virus binding to a surface modified with the nanostructure is directly detected; electrochemical detection, e.g. impedance changes when a virus binds to the nanostructure localised between interdigitated electrodes; a reporter (HRP, fluorophore) conjugated nucleic acid assay; Enzyme-linked Immunosorbent Assay (ELISA); fluorescence quenching, if binding of the virus to dye-labelled nanostructures affects fluorescence; or a strip-based immunodiagnostic test (e.g. on paper). The person skilled in the art will be able to determine in each case which is the most appropriate detection method.

Preferably, an infection inhibition assay is used, more preferably, an RSV-based plaque reduction assay. 24 h after seeding of HEp-2 cells, cells were infected with RSV and Inhibitor (peptide-conjugates DNA nanostructure) and incubated for about 24 to 72 h, preferably 48 h. Viral infection of host cells may be tested, e.g. by counting viral plaques after immunocytochemical staining using RSV-specific antibody Suitable infection inhibition assays are e.g. based on or chromogenic staining. For example, immunocytochemical staining or an enzymatic assay may be used. For example, techniques such as Enzyme-linked Immunosorbent Assay (ELISA) may be used.

Methods for producing the DNA strands of the nanostructure of the invention are well known to the person skilled in the art. For example, the DNA strands of the nanostructure of the invention may be produced by solid-phase synthesis. The peptide moieties may be produced as described above, such as by solid-phase peptide synthesis, preferably using the Fmoc- or Boc-strategy. Further methods are known to the person skilled in the art.

Unless defined otherwise, all technical and scientific terms and any acronyms used herein have the same meanings as commonly understood by one of ordinary skill in the art in the field of the invention. The invention is not limited to the particular methodology, protocols, and reagents described herein because they may vary. Although any methods and materials similar or equivalent to those described herein can be used in the practice of the present invention, the preferred methods, and materials are described herein. Further, the terminology used herein is for the purpose of describing particular embodiments only and is not intended to limit the scope of the present invention.

As used herein and in the appended claims, the singular forms "a", "an", and "the" include plural reference unless the context clearly dictates otherwise. Similarly, the words "comprise", "contain" and "encompass" are to be interpreted inclusively rather than exclusively. Similarly, the word "or" is intended to include "and" unless the context clearly indicates otherwise. The term "plurality" refers to two or more.

The following Figures and Examples are intended to illustrate various embodiments of the invention. As such, the specific modifications discussed are not to be construed as limitations on the scope of the invention. It will be apparent to the person skilled in the art that various equivalents, changes, and modifications may be made without departing from the scope of the invention, and it is thus to be understood that such equivalent embodiments are to be included herein.

FIGURE LEGEND

FIG. 1: Scheme of the used inhibition experiments. RSV-plaque reduction assay on human epithelial cells (HEp-2). HEp-2 cells were seeded in 96-well plate 24 h prior to infection (left). Next day, cells were infected with RSV (middle, white arrow). Simultaneously, peptides at concentrations of 20 µM were added to the cells (middle, black arrow). The inhibitory activity was determined 48 post infection by counting viral plaques after immunocytochemical staining using RSV-specific monoclonal antibody (right, black-checked arrow).

Figure 2:
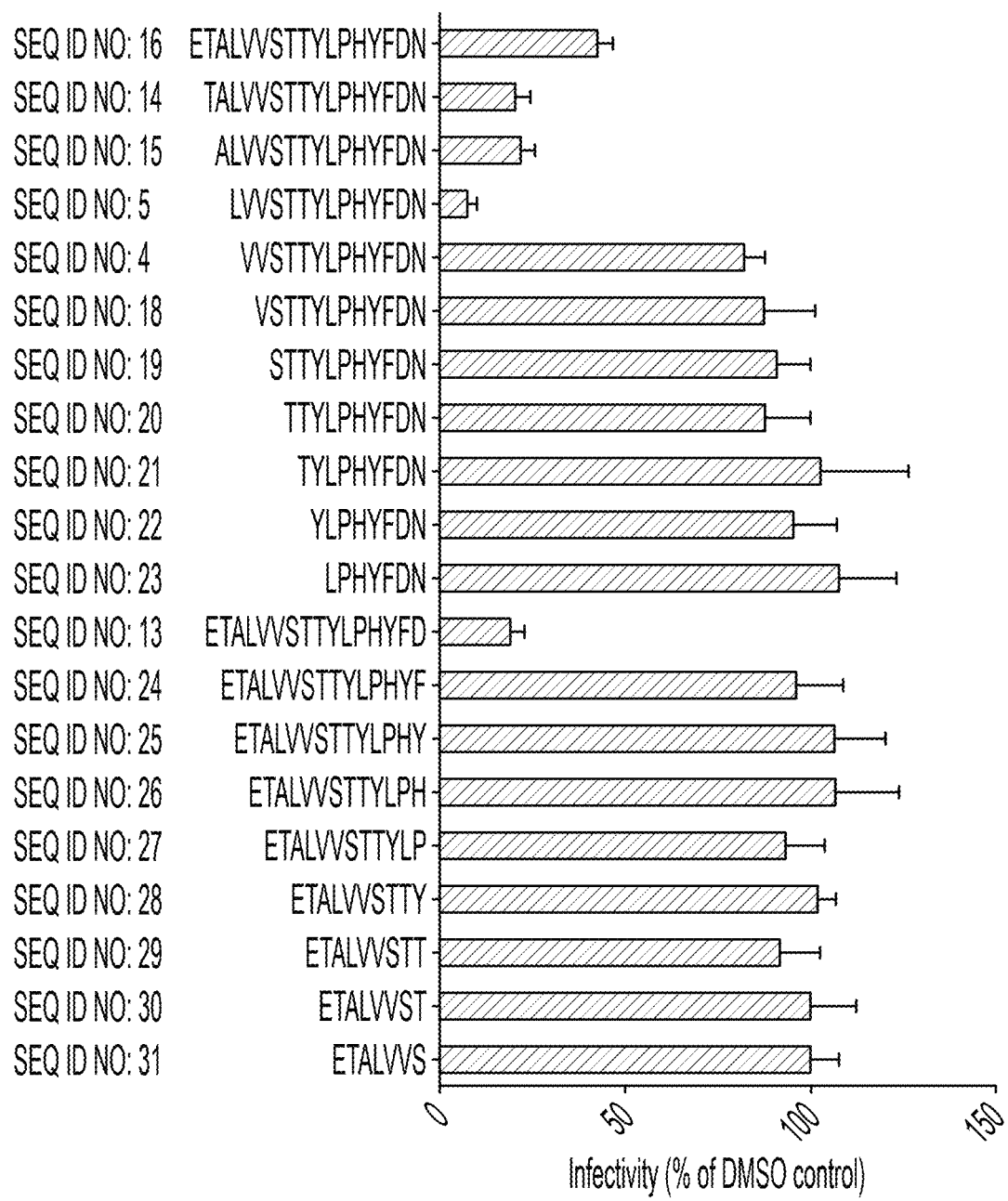

FIG. 2: Antiviral activity of truncated peptides against RSV in vitro. The diagram shows on its y-axis the sequences of various differently truncated peptides, each represented by its own bar. The x-axis displays the infectivity in percent in comparison to the corresponding DMSO control. The level of infectivity represented by each bar results from the mean value of triplicates normalized to corresponding DMSO controls±(standard deviation) SD.

Figure 3:
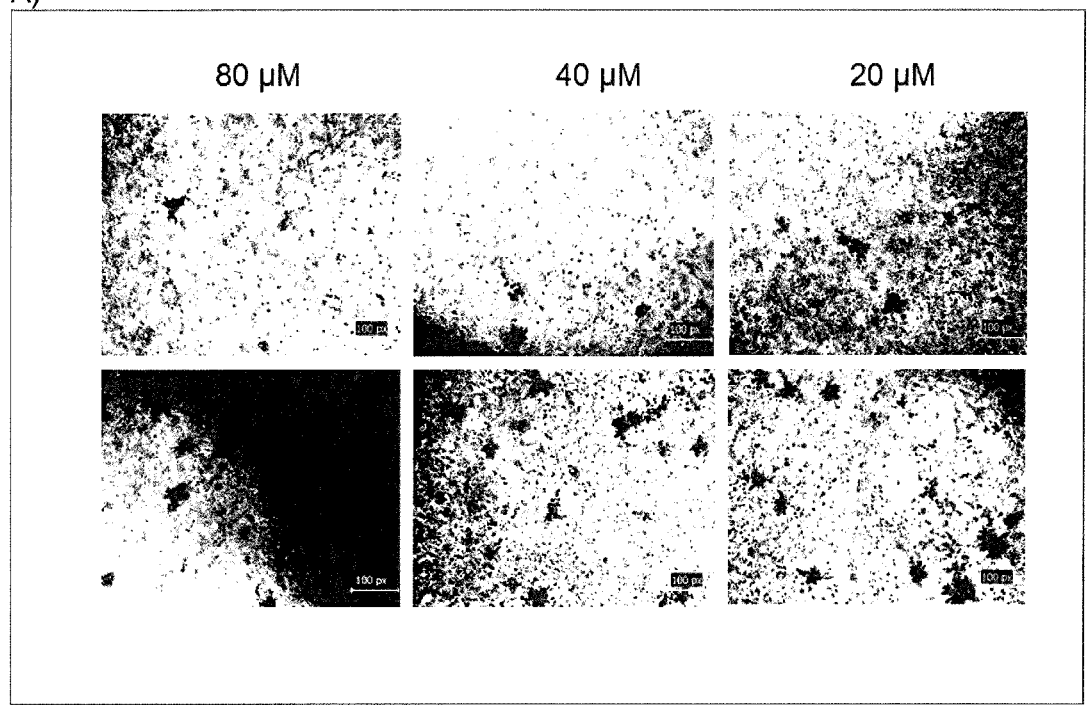
Figure 3:
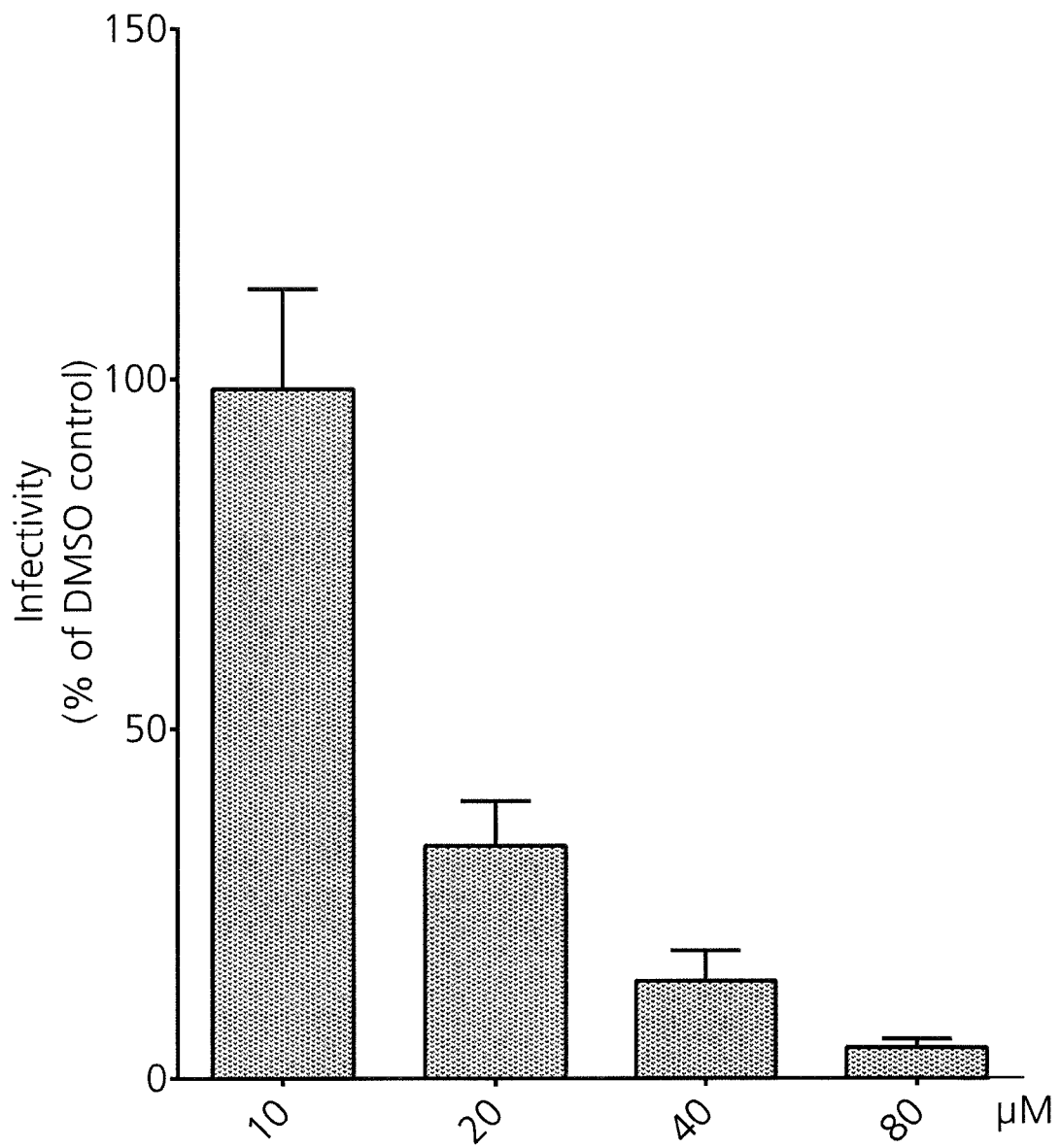

FIG. 3: Antiviral activity of LVVSTTYLPHYFDN peptide against RSV in vitro. In FIG. 3A, antiviral activity against RSV (ATCC VR-26—Long strain) was determined. In the plaque reduction assay, cells were treated with peptide (top lane) or DMSO as a control (bottom lane). Peptide concentrations added to the cells were from the left to the right: 80 µM, 40 µM and 20 µM. The inhibitory activity was determined 48 h post infection by counting viral plaques after immunocytochemical staining using RSV-specific monoclonal antibody. In FIG. 3B, antiviral activity of the peptide LVVSTTYLPHYFD against RSV (ATCC VR-26—Long strain) was quantified. The x-axis of the diagram shows the peptide concentration in µM (from the left to the right: 10 µM, 20 µM, 40 µM and 80 µM). The y-axis shows the infectivity of each sample in comparison to the infectivity of the DMSO control in percent. The inhibitory activity was determined 48 h post infection by counting viral plaques after immunocytochemical staining using RSV-specific monoclonal antibody. The level of infectivity represented by each bar results from the mean value of triplicates normalized to corresponding DMSO controls± (standard deviation) SD.

Figure 4:
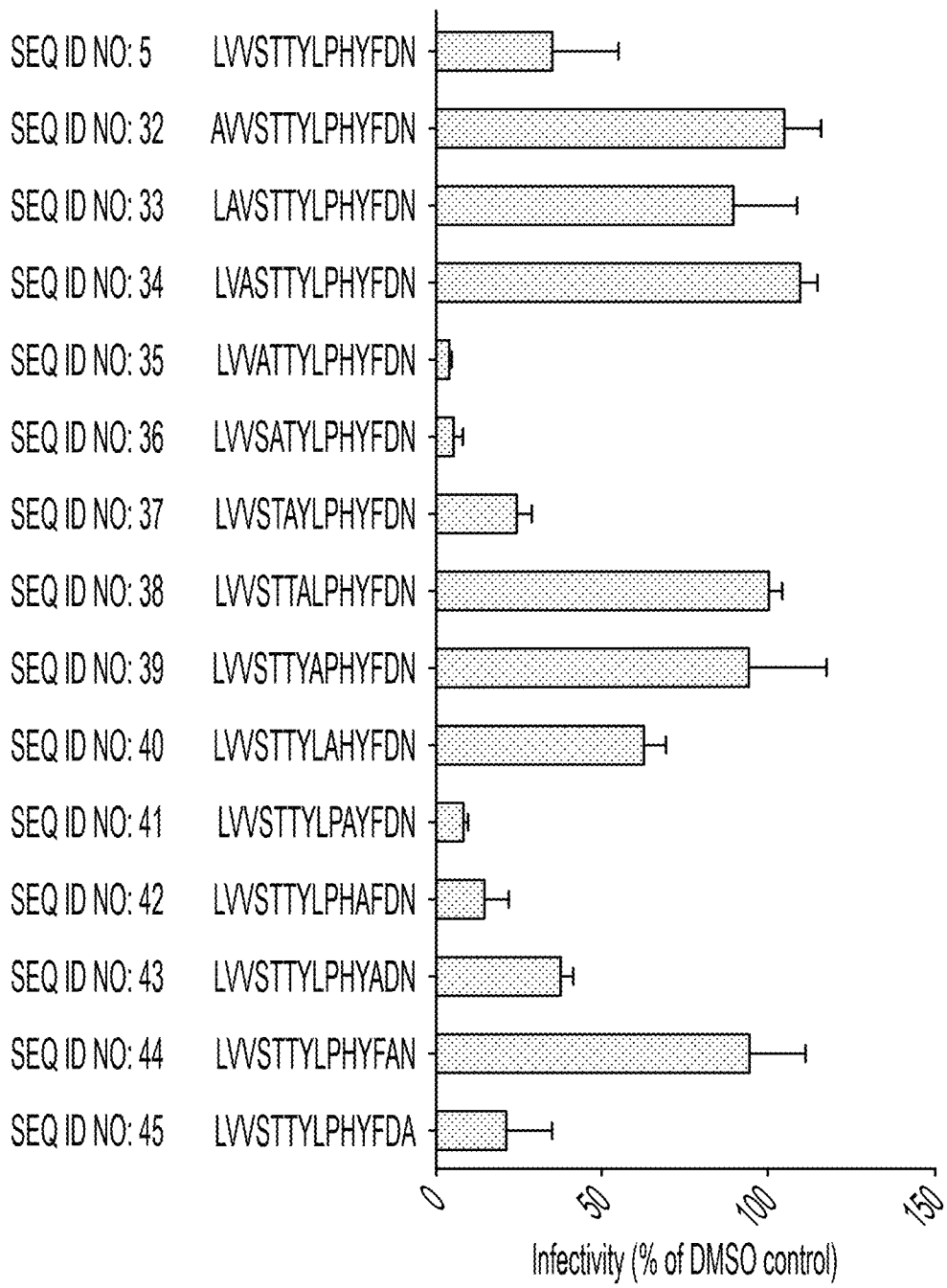

FIG. 4: Alanine scan of LVVSTTYLPHYFDN peptide. The diagram shows on its y-axis the sequences of peptides, each represented by its own bar. The unchanged LVVST-TYLPHYFDN peptide is on top. Below are the sequences wherein from top to bottom positions 1 to 14 of LVVST-TYLPHYFDN were exchanged with an alanine (marked by an "A"). The x-axis displays the infectivity in percent in comparison to the corresponding DMSO control. The level of infectivity represented by each bar results from the mean value of triplicates normalized to corresponding DMSO controls±(standard deviation) SD.

Figure 5:
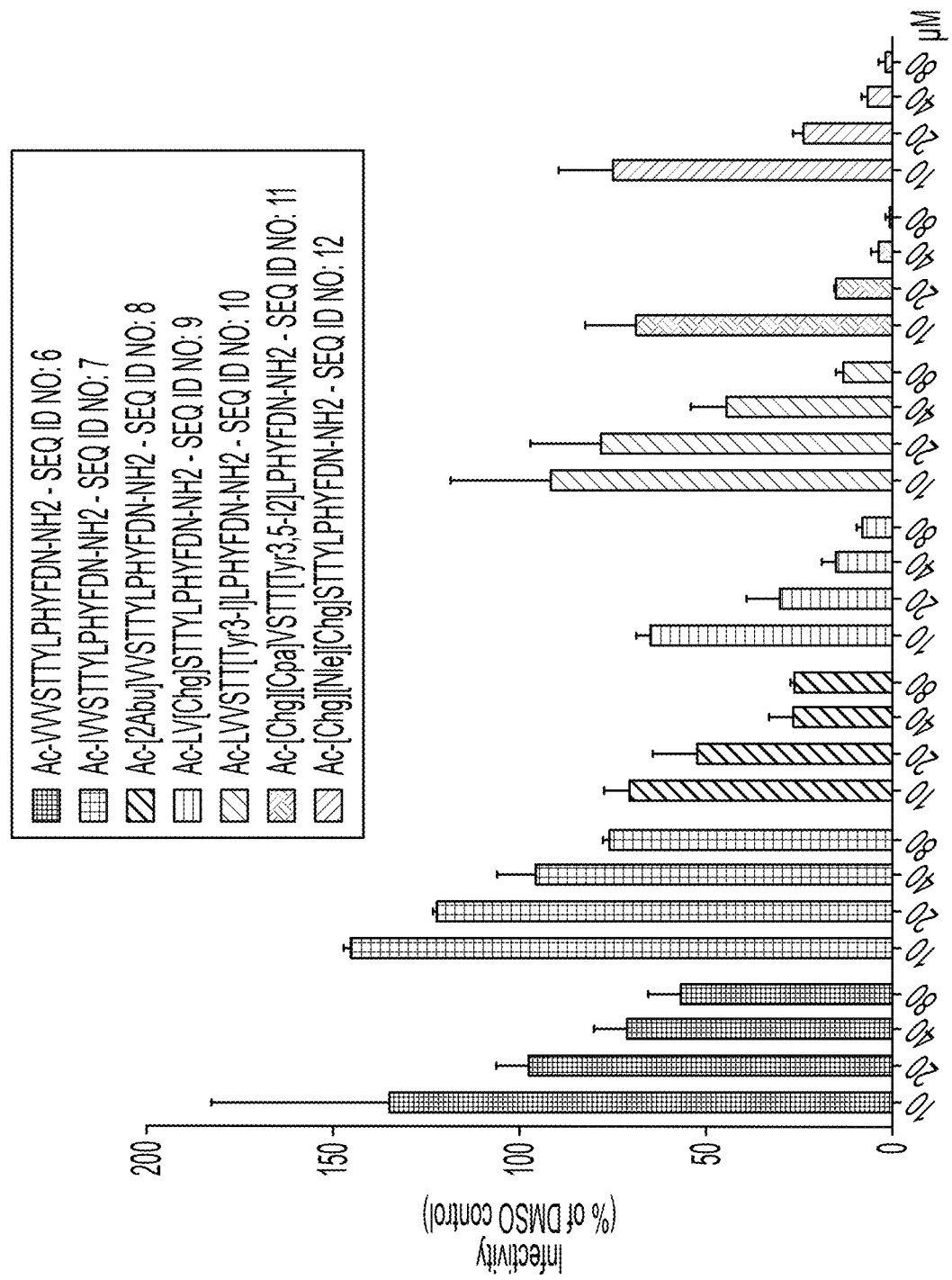

FIG. 5: In vitro antiviral activity of peptides with unnatural amino acid modifications. The peptide sequences used are listed in the key on the top right of the diagram. The pattern in the square left of each sequence corresponds to the pattern used in the bars. The x-axis of the diagram shows the applied peptide concentrations of the respective peptide in µM. The y-axis shows the infectivity of each sample in comparison to the infectivity of the corresponding DMSO control in percent. The level of infectivity represented by each bar results from the mean value of triplicates normalized to corresponding DMSO controls±SD.

Figure 6:
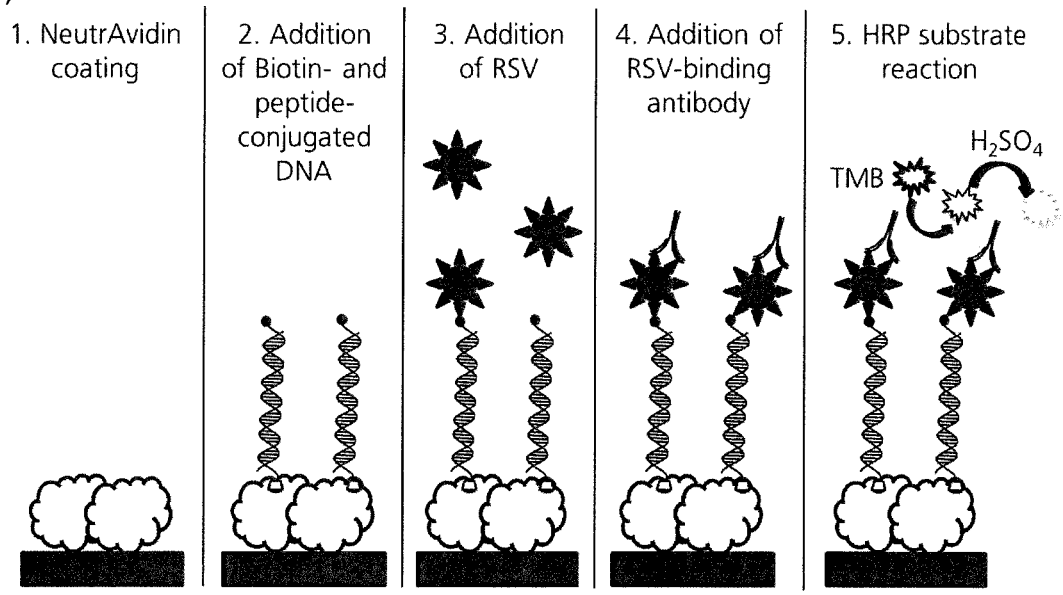
Figure 6:
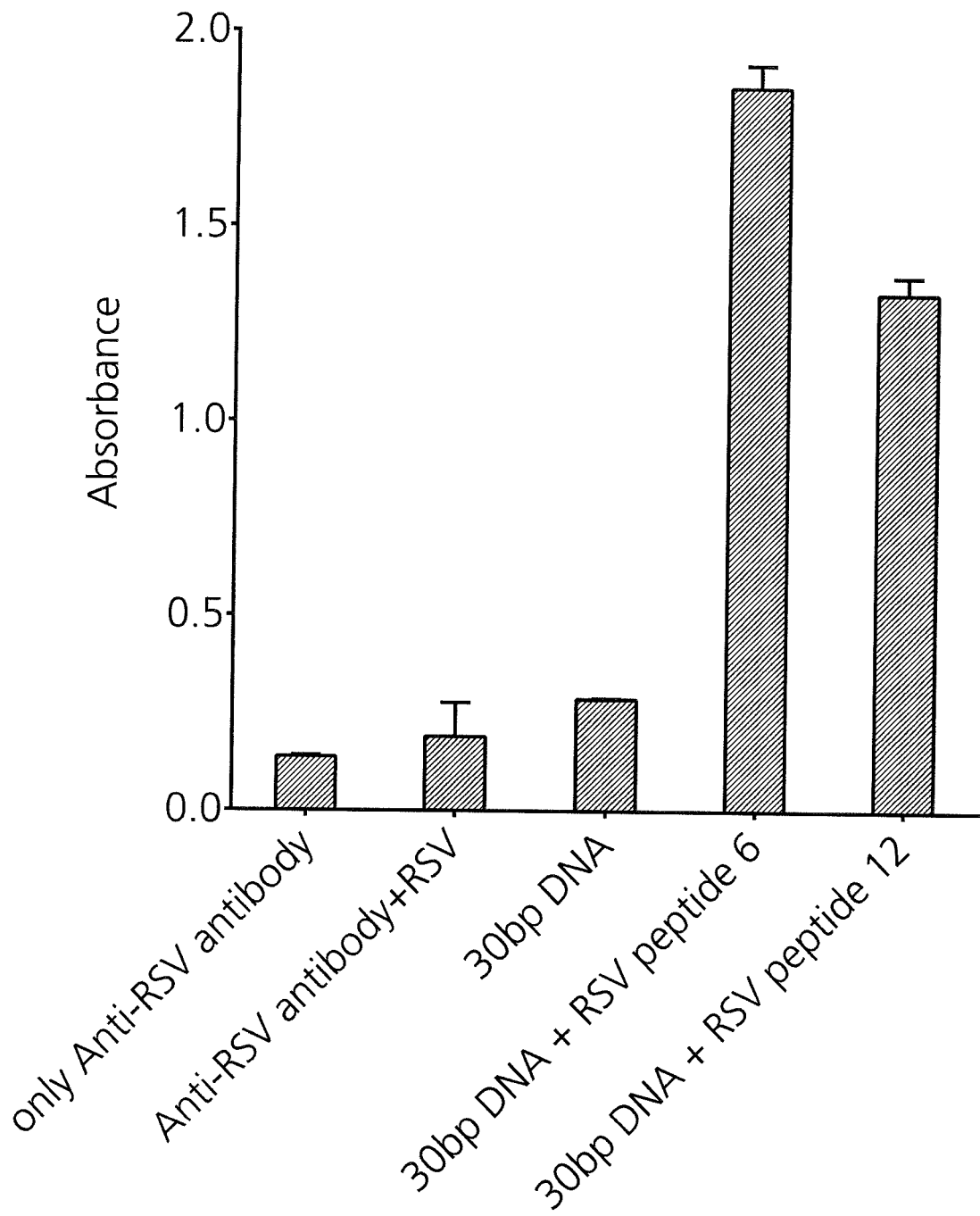

FIG. 6: Binding of novel DNA-Peptide construct to RSV. FIG. 6A shows a scheme of the used ELISA, progressing from the left to the right. The single compounds are not in a representative scale. TMB=3,3',5,5'-Tetramethylbenzidine, HRP=Horseradish peroxidase. FIG. 6B shows the ELISA results of peptide 6 and peptide 12 coupled to DNA. The x-axis of the diagram represents the different samples, the y-axis shows the absorbance. "Only Anti-RSV antibody" and "Anti-RSV antibody+RSV" represent internal ELISA controls and lack components described in FIG. 6A. The other three samples have all components described in FIG. 6A. Each bar results from the mean values of triplicates±SD.

Figure 7:
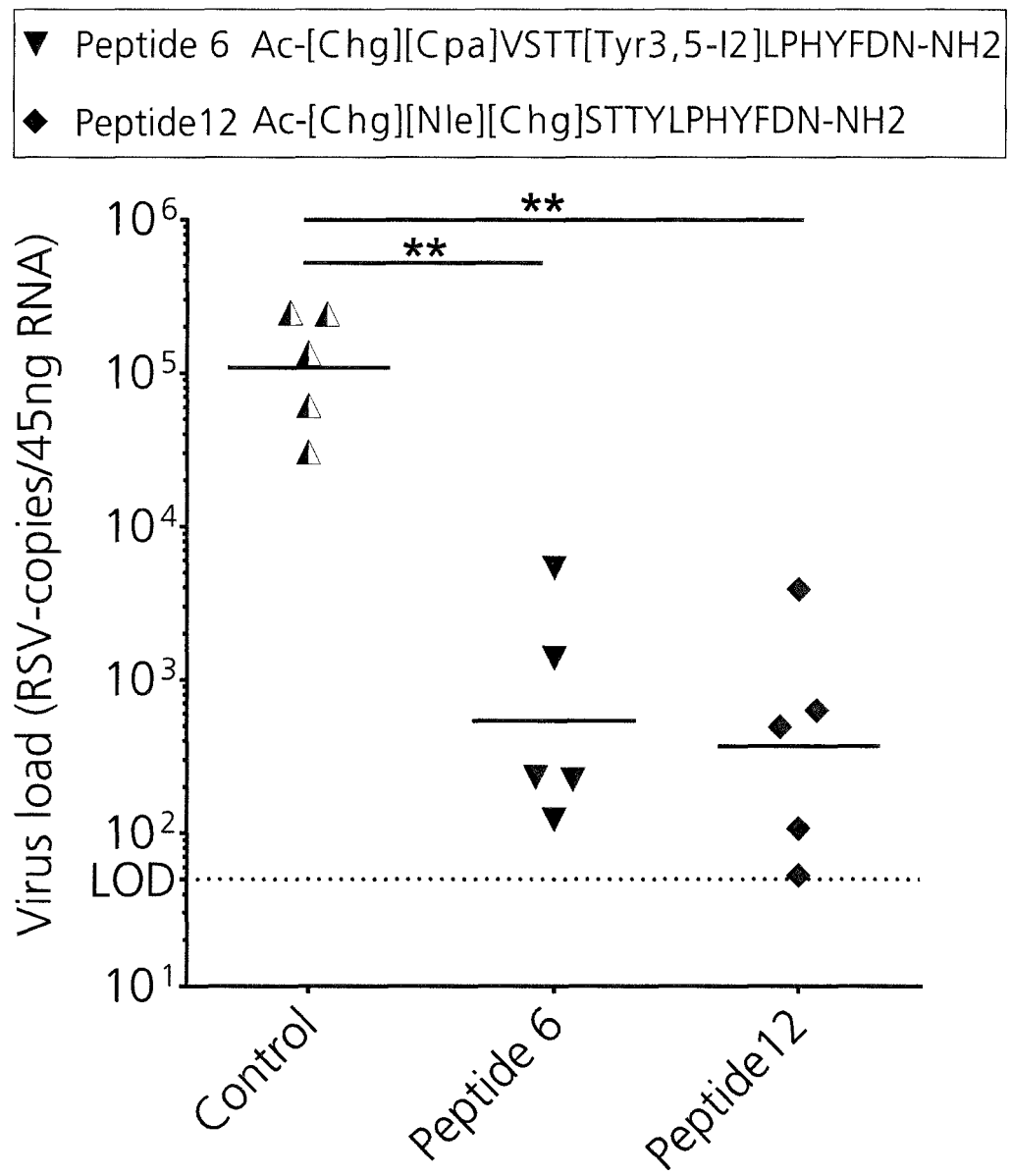

FIG. 7: Effects of intranasal administration of peptides on RSV infection in vivo. The x-axis of the diagram shows the different mice groups, while the y-axis shows the virus load in mice lungs in RSV-copies per 45 ng of total RNA. Each data point represents a single mouse: The half-filled triangle pointing upwards each represent mock-treated control mouse, the filled triangles pointing downwards each represent a mouse, which received peptide 6 and the squares each represent a mouse, which received peptide 12. Geometric mean values are given as bars. Significant differences are calculated by One-Way ANOVA followed by Tukey test (*, P<0.05; , P<0.01; *, P<0.001). LOD: Limit of detection. In the present experiment, LOD was 50 RSV copies.

FIG. 8: In vitro antiviral efficacy of RSV inhibitory cyclic peptide. Human epithelial cells (HEp-2) were seeded in 96-well cell culture plate ($10^4$ cells/well) 24 h prior to the assay. Peptide, whose sequence is shown in the figure (cyclic peptide of peptide with sequence CETALVVST-TYLPHYFDNC; SEQ ID No: 46), or the respective amount of DMSO vehicle control was mixed with RSV, incubated for 10 min at 37° C. and then added to the cells. The final concentrations on cells were 0.625-80 µM. The inhibitory activity was determined 48 h post infection by counting viral plaques. Shown are mean values of triplicates normalized to corresponding DMSO controls±SD.

FIG. 9: Effect of pre-treatment of cells with RSV inhibitory peptide. Human epithelial cells (HEp-2) were seeded in 96-well cell culture plate ($10^4$ cells/well) 24 h prior to the assay. Peptide, whose sequence is Ac-LVVST-TYLPHYFDN-NH2 (SEQ ID No: 5), or the respective amount of DMSO vehicle control was applied to cells at the indicated concentrations and incubated at 37° C. for 3 h. After incubation, cells were either left in the same medium or washed and the medium replaced with fresh one. Then, RSV was applied to the cells. The inhibitory activity was determined 48 h post infection by counting viral plaques. Shown are mean values of triplicates normalized to corresponding DMSO controls±SD.

FIG. 10: In vitro antiviral efficacy of peptide-DNA trimers against RSV infection. DNA trimeric scaffolds which carry three peptide inhibitor arms were synthesized to target all three RSV-F subunits at once. To test the antiviral activity of constructed Peptide [Chg][Cpa]VSTT[Tyr3,5-I2]LPHYFDN (SEQ ID No: 11)-DNA trimers in comparison with unmodified DNA-timer (without bound peptides), human epithelial cells (HEp-2) were seeded in 96-well cell culture plate ($10^4$ cells/well) 24 h prior to the assay. DNA constructs, or the respective amount of DMSO vehicle control was mixed with RSV, incubated for 10 min at 37° C. and then added to the cells. The final concentrations on cells were 0.009-1.25 µM. The inhibitory activity was determined 48 h post infection by counting viral plaques. Shown are mean values of triplicates normalized to corresponding DMSO controls±SD.

FIG. 11: In vitro prophylactic effect of RSV inhibitory peptide on HEp-2 cells. Human epithelial cells (HEp-2) were seeded in 96-well cell culture plate ($10^4$ cells/well) 24 h prior to the assay. Cells were treated either with peptide, whose sequence is shown in the figure (SEQ ID No: 9), at concentration of 20 µM or the respective amount of DMSO vehicle control at the indicated time points prior to infection with RSV. The inhibitory activity was determined 48 h post infection by counting viral plaques. Shown are mean values of triplicates±SD.

Figure 12A:
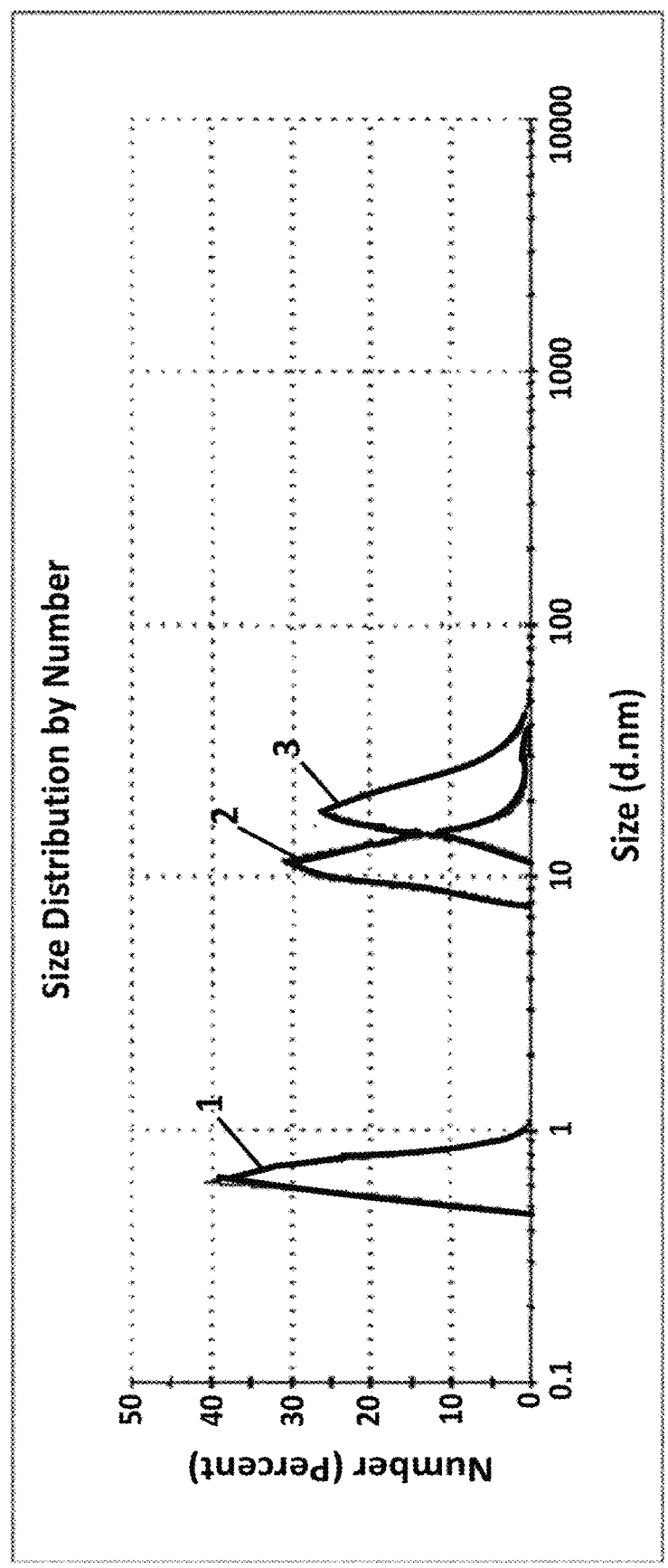
Figure 12B:
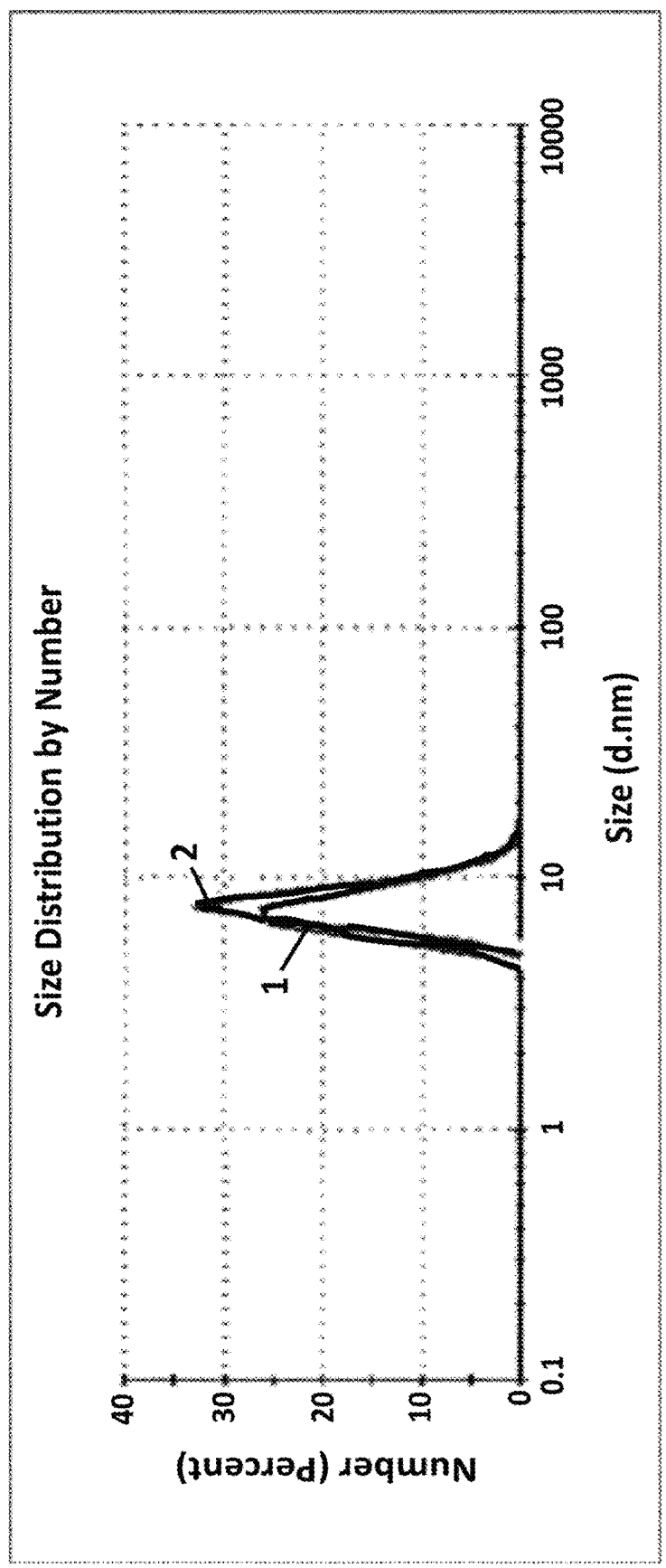

FIG. 12: Detection of aggregation via dynamic light scattering. A) Measurement of Peptide [Chg][Cpa]VSTT[Tyr3,5-I2]LPHYFDN (SEQ ID No: 11). Shown are measurements at concentrations of 50 µM (curve 1) and two times 100 µM (curve 2 and 3) in 1×PBS, 10 mM $MgCl_2$, 0.05% Tween20 buffer displayed as size distribution by number. B) Measurement of Peptide [Chg][Cpa]VSTT[Tyr3,5-I2]LPHYFDN (SEQ ID No: 11) attached to 30 bp double-stranded DNA. Shown are measurements at concentrations of 0.12 µM (curve 1) and 1 µM (curve 2) in 1×PBS, 10 mM $MgCl_2$, 0.05% Tween20 buffer displayed as size distribution by number.

EXAMPLES

Example 1—Rational Design and In Vitro Screening of Peptide Inhibitors

To identify the minimal peptide sequence required for inhibition of RSV, a series of 20 peptides with overlapping sequences were designed to target the antigenic site (Ø) on the prefusion conformation of F protein.

The designed peptides were synthesized and screened for their inhibitory activity against RSV in a cell culture-based plaque reduction assay as illustrated in FIG. 1. In detail, Anti-RSV activity was assessed in plaque reduction assay as follows: HEp-2 cells were seeded in a 96-well plate 24 h prior to infection. Next day, cells were infected with RSV (ATCC VR-26—Long strain). Simultaneously, peptides at concentrations of 20 μM were added to the cells. The inhibitory activity was determined 48 h post infection by counting viral plaques after immunocytochemical staining using RSV-specific monoclonal antibody.

A 14 amino acid long peptide that has the following sequence: LVVSTTYLPHYFDN was identified to be able to inhibit infection with RSV on human epithelial cells (FIG. 2).

Example 2—Determination of Anti-RSV Activity Based on Peptide Concentration

Anti-RSV activity was assessed in plaque reduction assay. HEp-2 cells were seeded in 96-well plate 24 h prior to infection. Next day, cells were infected with RSV—Long (FIGS. 3A and 3B). Simultaneously, peptide at concentrations of 10-80 μM was added to the cells. The inhibitory activity was determined 48 h post infection by counting viral plaques after immunocytochemical staining using RSV-specific antibody.

A 14 amino acid long peptide that has the following sequence: LVVSTTYLPHYFDN was identified to be able to inhibit infection with RSV on human epithelial cells by >50% at a concentration of 20 μM (FIG. 3B).

Thus, the peptide that has the following sequence: LVVSTTYLPHYFDN was selected as a lead peptide candidate for developing inhibitors of RSV infection.

Example 3—Structure-Activity Relationship Study

In order to investigate the role of individual amino acids in the inhibitory function, an alanine-scanning mutagenesis of the lead peptide was performed (FIG. 4).

In detail, anti-RSV activity was assessed in plaque reduction assay. HEp-2 cells were seeded in 96-well plate 24 h prior to infection. Next day, cells were infected with RSV (~100 PFU/well). Simultaneously, peptides at concentrations of 20 μM were added to the cells. Viral plaques were counted after immunocytochemical staining using RSV-specific antibody at 48 h after infection.

As shown in FIG. 4, 7 key aa-residues involved in the inhibitory activity against RSV were identified. Significant reduction in RSV inhibition was observed when these residues were substituted with alanine, whereas substitution of the remaining 7 amino acids did not alter the activity of the native peptide activity.

Example 4—Incorporation of Non-Natural Amino Acids

The main problems in using peptides as antivirals are their low stability and rapid degradation by proteases which can limit their therapeutic value. To improve the stability of the lead peptide, different non-natural amino acids were introduced at multiple positions into its sequence. Unnatural amino acid-modified peptides are more resistant to proteolytic cleavage and offer an increase in the in vivo half-life and activity.

Next, anti-RSV activity was assessed in plaque reduction assay. HEp-2 cells were seeded in 96-well plate 24 h prior to infection. Peptides at concentrations of 10-80 μM were incubated with RSV for 10 min at 37° C. and then added to the cells. Viral plaques were counted after immunocytochemical staining using RSV-specific antibody at 48 h after infection. FIG. 5 shows the mean values of triplicates, normalized to corresponding DMSO controls±SD (FIG. 5).

It was found that antiviral activity of the analog peptides with different unnatural amino acids substitution was preserved (FIG. 5). Several selected peptide candidates were further tested in vivo.

Binding of newly developed peptides 6 (Ac-[Chg][Cpa]VSTT[Tyr3,5-I2]LPHYFDN-NH2) and 12 (Ac-[Chg][Nle][Chg]STTYLPHYFDN-NH2) to active RSV was verified by enzyme-linked immunosorbent assay (FIG. 6).

FIG. 6A illustrates the scheme of the used ELISA. It has to be noted that the single compounds are not in a representative scale. ELISA results of peptide 6 and peptide 12 coupled to DNA are shown in FIG. 6B and revealed that RSV was strongly interacting with the DNA-peptide construct but not to the DNA (30 bp DNA). Unspecific binding of RSV and/or RSV-antibody to neutravidin was excluded by using the two other controls.

Example 5—In Vivo Evaluation

In addition, the ability of designed peptides to provide protection in an in vivo challenge experiment was tested. Female BALB/c mice were infected with RSV and treated simultaneously with 150 μg of peptide. Five days post infection, viral loads in mice lungs were quantified. Treatment with both tested peptides (FIG. 7) led to significant reduction (100-1000 fold) of viral load in the lungs of treated mice when compared to mock-treated control.

In detail, 9 weeks old female BALB/c mice (n=5 per group) were inoculated via intranasal route simultaneously with $10^6$ PFU/mouse of RSV—Long strain (ATCC VR-26—Long strain) and 150 μg of peptide 6 or 12. Control mice received RSV with DMSO-PBS. Mice were sacrificed at day 5 postinfection, and their lungs were collected. Viral load in lungs was quantified by RT-qPCR.

The results (FIG. 7) revealed that the designed peptides are effective and inhibit RSV replication in vivo.

Example 6—In Vitro Antiviral Efficacy of RSV Inhibitory Cyclic Peptide

Human epithelial cells (HEp-2) were seeded in 96-well cell culture plate ($10^4$ cells/well) 24 h prior to the assay. Peptide, whose sequence is shown in FIG. 8 (cyclic peptide CETALVVSTTYLPHYFDNC; SEQ ID No: 46), or the respective amount of DMSO vehicle control was mixed with RSV, incubated for 10 min at 37° C. and then added to the cells. The final concentrations on cells were 0.625-80 μM. The inhibitory activity was determined 48 h post infection by counting viral plaques. The results are shown in FIG. 8. Shown are mean values of triplicates normalized to corresponding DMSO controls±SD.

The results indicate that cyclization of the peptides of the invention does not negatively affect in vitro antiviral activity.

Example 7—Effect of Pre-Treatment of Cells with RSV Inhibitory Peptide

Human epithelial cells (HEp-2) were seeded in 96-well cell culture plate ($10^4$ cells/well) 24 h prior to the assay. Peptide, whose sequence is Ac-LVVSTTYLPHYFDN-NH2 (SEQ ID No: 5), or the respective amount of DMSO vehicle control was applied to cells at the indicated concentrations and incubated at 37° C. for 3 h. After incubation, cells were either left in the same medium or washed and the medium replaced with fresh one. Then, RSV was applied to the cells. The inhibitory activity was determined 48 h post infection by counting viral plaques. The results are shown in FIG. 9.

Shown are mean values of triplicates normalized to corresponding DMSO controls±SD.

The results demonstrate that the peptides of the invention are useful for the prophylactic treatment of an RSV infection.

Example 8—In Vitro Antiviral Efficacy of Peptide-DNA Trimers Against RSV Infection DNA trimeric scaffolds which carry three peptide inhibitor arms were synthesized to target all three RSV-F subunits at once. To test the antiviral activity of constructed Peptide [Chg][Cpa]VSTT[Tyr3,5-I2]LPHYFDN (SEQ ID No: 11)-DNA trimers in comparison with unmodified DNA-timer (without bound peptides), human epithelial cells (HEp-2) were seeded in 96-well cell culture plate ($10^4$ cells/well) 24 h prior to the assay. DNA constructs, or the respective amount of DMSO vehicle control was mixed with RSV, incubated for 10 min at 37° C. and then added to the cells. The final concentrations on cells were 0.009-1.25 μM. The inhibitory activity was determined 48 h post infection by counting viral plaques. The results are shown in FIG. 10. Shown are mean values of triplicates normalized to corresponding DMSO controls±SD.

The results demonstrate that the nanostructures of the invention exhibit antiviral activity for RSV and are useful for the treatment, prophylactic treatment or amelioration of an RSV infection.

Example 9—In Vitro Prophylactic Effect of RSV Inhibitory Peptide on HEp-2 Cells Human epithelial cells (HEp-2) were seeded in 96-well cell culture plate ($10^4$ cells/well) 24 h prior to the assay. Cells were treated either with peptide, whose sequence is shown in FIG. 12 (SEQ ID No: 9), at concentration of 20 μM or the respective amount of DMSO vehicle control at the indicated time points prior to infection with RSV. The inhibitory activity was determined 48 h post infection by counting viral plaques. The results are shown in FIG. 11. Shown are mean values of triplicates±SD.

The results demonstrate that the peptides of the invention are useful for the prophylactic treatment of an RSV infection. In particular, the data demonstrate that the peptides are stable for long periods of time in biological conditions. The peptides are therefore useful for in vivo applications in the human and mammal body, for therapeutic and prophylactic purposes.

Example 10—Detection of Aggregation Via Dynamic Light Scattering

A) Measurement of Peptide [Chg][Cpa]VSTT[Tyr3,5-I2]LPHYFDN (SEQ ID No: 11). The results are shown in FIG. 12A.

Shown are measurements at concentrations of 50 μM (curve 1) and two times 100 μM (curve 2 and 3) in 1×PBS, 10 mM $MgCl_2$, 0.05% Tween20 buffer displayed as size distribution by number.

B) Measurement of Peptide [Chg][Cpa]VSTT[Tyr3,5-I2]LPHYFDN (SEQ ID No: 11) attached to 30 bp double-stranded DNA. The results are shown in FIG. 12A. Shown are measurements at concentrations of 0.12 μM (curve 1) and 1 μM (curve 2) in 1×PBS, 10 mM $MgCl_2$, 0.05% Tween20 buffer displayed as size distribution by number.

The results indicate that attachment of the peptides to the DNA scaffold in the nanostructures of the invention may increase bioavailability of the peptides in vivo, through elimination of aggregation.

REFERENCES

Blaskovich M. A. T.: Unusual Amino Acids in Medicinal Chemistry; J. Med. Chem. 2016, 59, 10807-10836. DOI: 10.1021/acs.jmedchem.6b00319)

Ganz, David (2009): Review article. When is a library not a library? In Early Medieval Europe 17 (4), pp. 444-453. DOI: 10.1111/j.1468-0254.2009.00285.x.

Homaira, Nusrat; Rawlinson, William; Snelling, Thomas L.; Jaffe, Adam (2014): Effectiveness of Palivizumab in Preventing RSV Hospitalization in High Risk Children: A Real-World Perspective. In International journal of pediatrics 2014, p. 571609. DOI: 10.1155/2014/571609.

IAN (1998): Palivizumab, a Humanized Respiratory Syncytial Virus Monoclonal Antibody, Reduces Hospitalization From Respiratory Syncytial Virus Infection in High-risk Infants. In PEDIATRICS 102 (3), pp. 531-537. DOI: 10.1542/peds.102.3.531.

Kapikian, A. Z.; Mitchell, R. H.; Chanock, R. M.; Shvedoff, R. A.; Stewart, C. E. (1969): An epidemiologic study of altered clinical reactivity to respiratory syncytial (RS) virus infection in children previously vaccinated with an inactivated RS virus vaccine. In American journal of epidemiology 89 (4), pp. 405-421.

McLellan, Jason S.; Chen, Man; Leung, Sherman; Graepel, Kevin W.; Du, Xiulian; Yang, Yongping et al. (2013): Structure of RSV fusion glycoprotein trimer bound to a prefusion-specific neutralizing antibody. In Science (New York, N.Y.) 340 (6136), pp. 1113-1117. DOI: 10.1126/science.1234914.

McLellan, Jason S.; Yang, Yongping; Graham, Barney S.; Kwong, Peter D. (2011): Structure of respiratory syncytial virus fusion glycoprotein in the postfusion conformation reveals preservation of neutralizing epitopes. In Journal of Virology 85 (15), pp. 7788-7796. DOI: 10.1128/JVI.00555-11.

Pinheiro, V B et al. (2012) Synthetic Genetic Polymers Capable of Heredity and Evolution. Science, 336, 341-344. doi: 10.1126/science.1217622.

Memczak, H. et al. (2016) Anti-Hemagglutinin Antibody Derived Lead Peptides for Inhibitors of Influenza Virus Binding. PLoS One 11(7): e0159074. doi: 10.1371/journal.pone.0159074.

The invention claimed is:

1. A peptide comprising a sequence selected from:

VVVSTTYLPHYFDN; (SEQ ID No: 6)

IVVSTTYLPHYFDN; (SEQ ID No: 7)

[2-Abu]VVSTTYLPHYFDN; (SEQ ID No: 8)

LV[Chg]STTYLPHYFDN; (SEQ ID No: 9)

LVVSTT[Tyr3-I]LPHYFDN; (SEQ ID No: 10)

[Chg][Cpa]VSTT[Tyr3,5-I2]LPHYFDN; (SEQ ID No: 11)
or

[Chg][Nle][Chg]STTYLPHYFDN; (SEQ ID No: 12)

wherein the peptide is no more than 25 amino acids in length,
or a retro-inverso peptide thereof.

2. The peptide of claim 1, wherein the peptide is no more than 20 amino acids in length, or a retro-inverso peptide thereof.

3. The peptide of claim 1, wherein the peptide:
comprises L-amino acids, D-amino acids, or a mixture thereof,
comprises at least one backbone-modified amino acid,
is a cyclic molecule,
comprises at least one non-peptide moiety selected from a coupling group, a polyethylene glycol (PEG) moiety, a detectable label, a protective group, a lipid moiety and a sugar moiety, or
comprises one or more post-translational modifications, and/or
is covalently or non-covalently bound to a scaffold;
or a retro-inverso peptide thereof.

4. The peptide of claim 1, consisting of a sequence selected from:

VVVSTTYLPHYFDN (SEQ ID No: 6)

IVVSTTYLPHYFDN (SEQ ID No: 7)

[-Abu]VVSTTYLPHYFDN (SEQ ID No: 8)

LV[Chg]STTYLPHYFDN (SEQ ID No: 9)

LVVSTT[Tyr3-I]LPHYFDN, (SEQ ID No: 10)

[Chg][Cpa]VSTT[Tyr3,5-I2]LPHYFDN, and (SEQ ID No: 11)

[Chg][Nle][Chg]STTYLPHYFDN, (SEQ ID No: 12)

or a retro-inverso peptide thereof.

5. A pharmaceutical composition comprising the peptide of claim 1, wherein the pharmaceutical composition comprises one or more pharmaceutically acceptable adjuvants and/or excipients.

* * * * *